May 13, 1941.  H. I. MORRIS  2,241,414
FORMING MACHINE
Filed Oct. 24, 1936   18 Sheets-Sheet 13

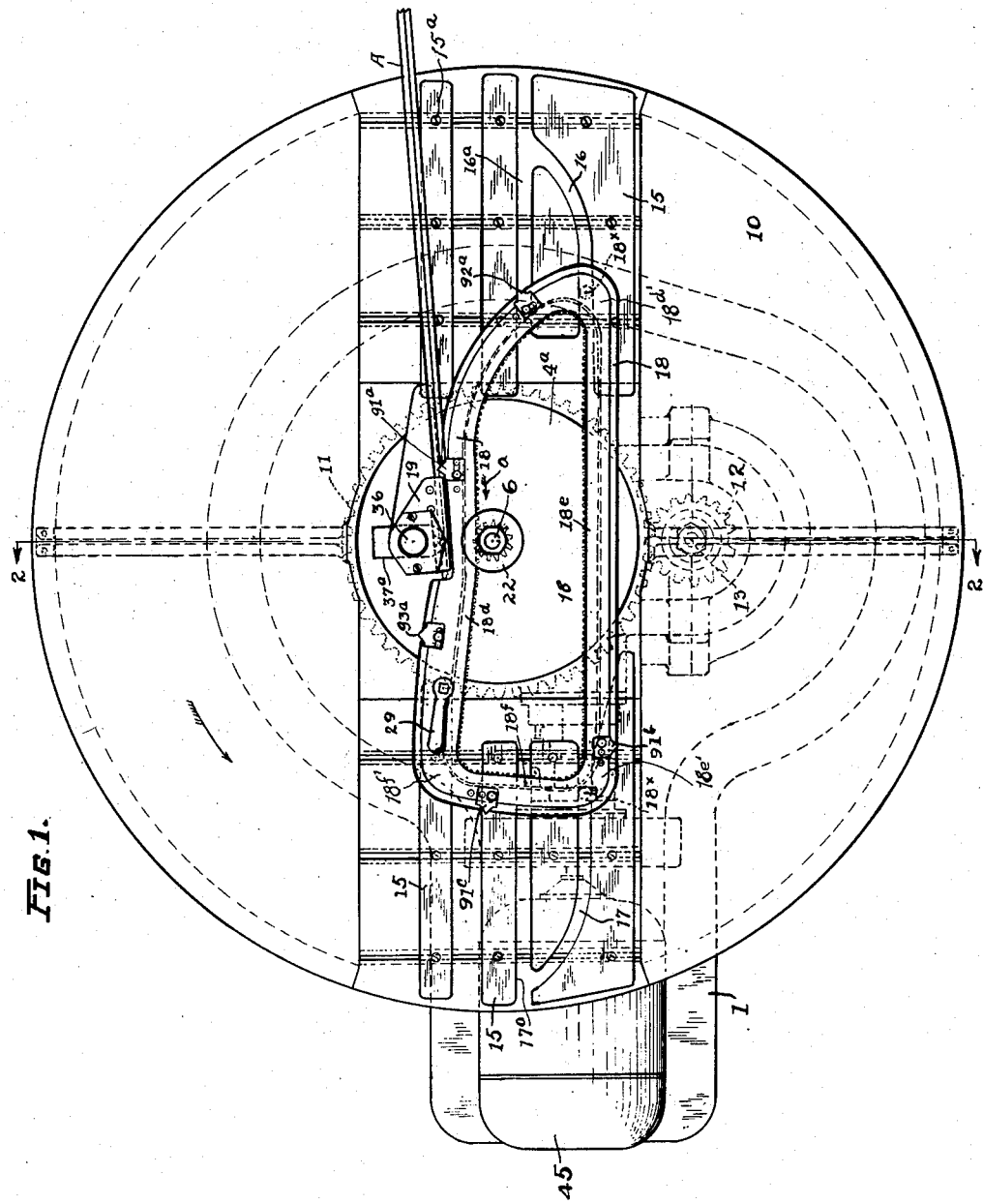

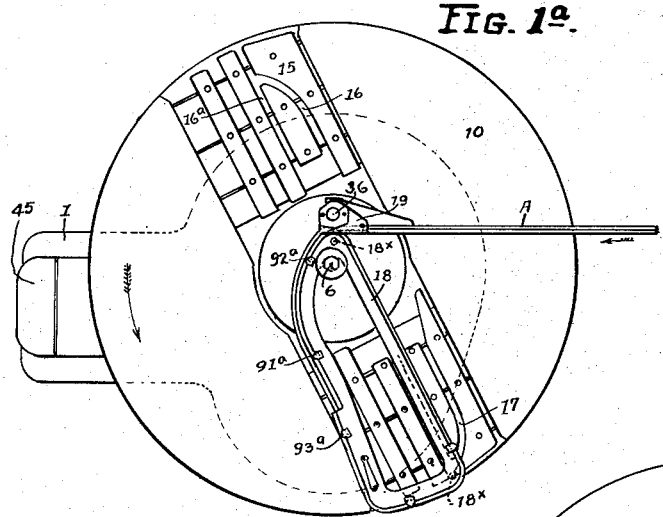
Fig. 1ª.
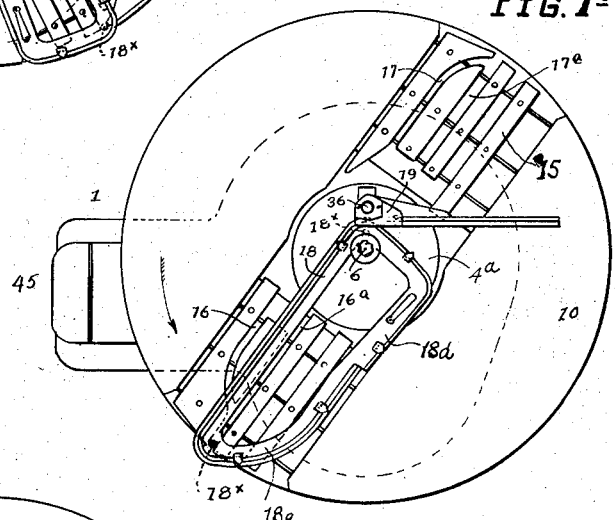
Fig. 1ᵇ.
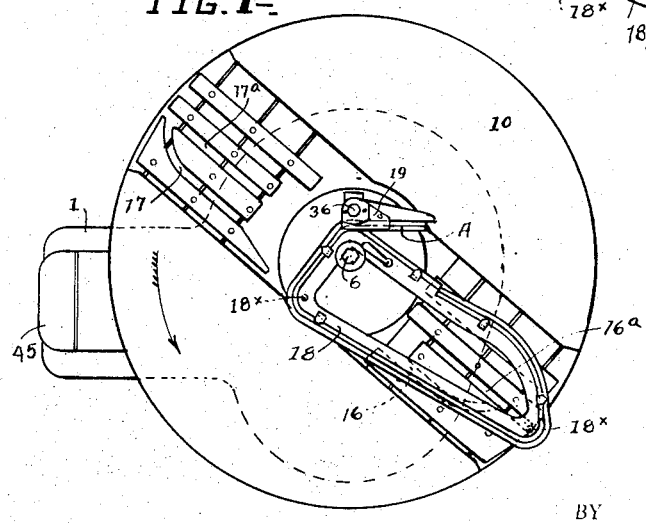
Fig. 1ᶜ.
INVENTOR.
HOWARD I. MORRIS.
BY Geo. B Pitts
ATTORNEY.

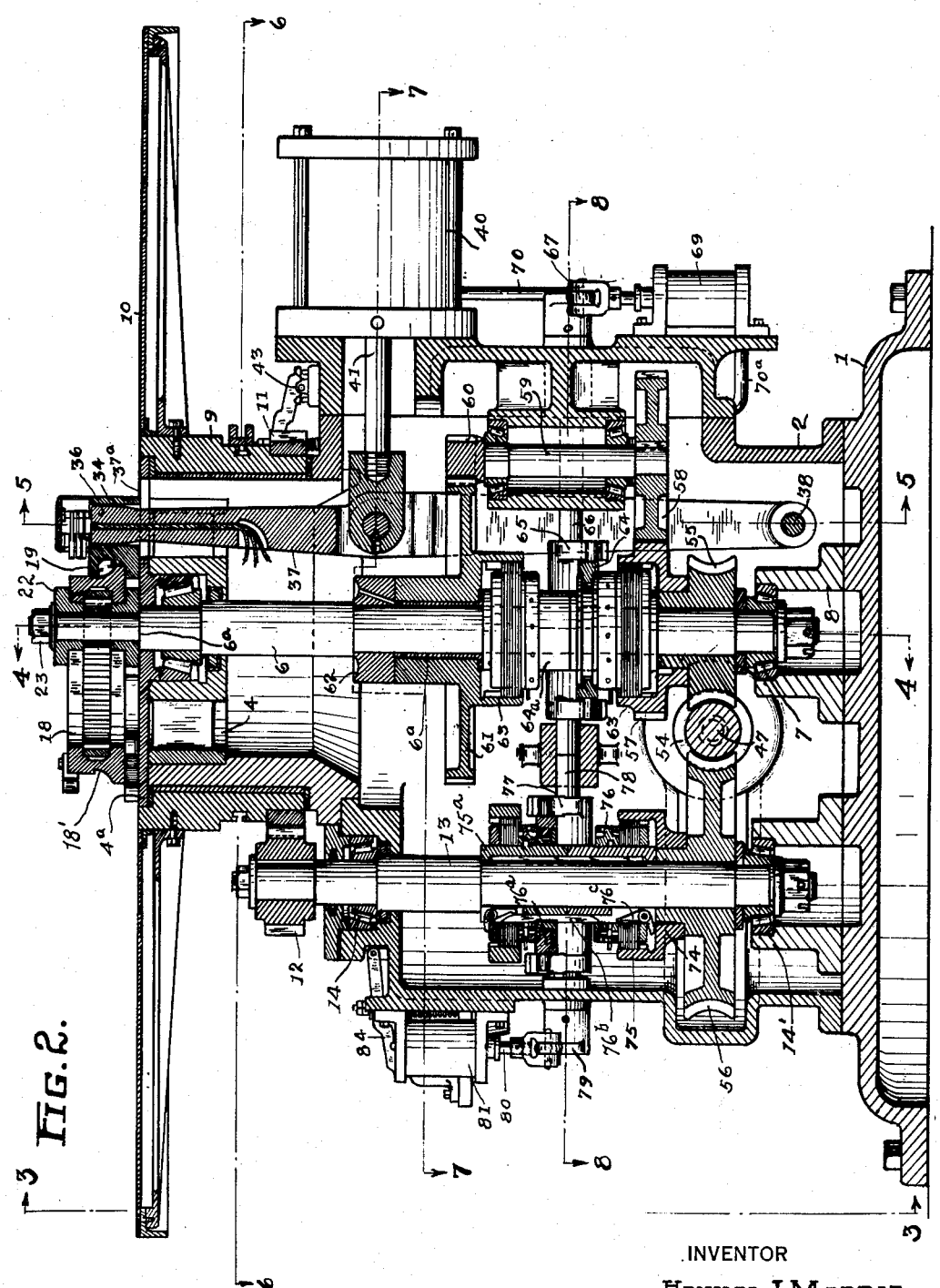

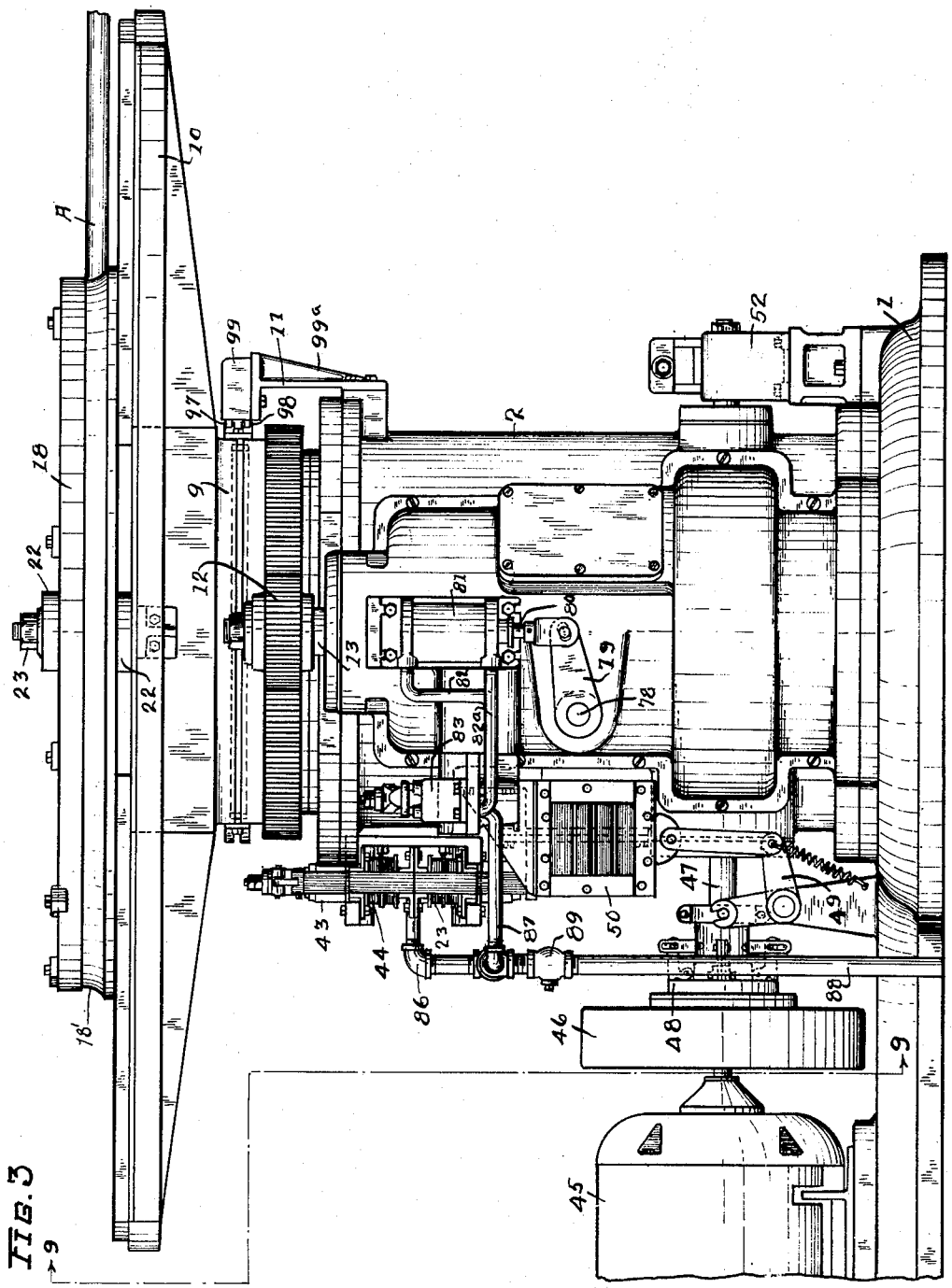

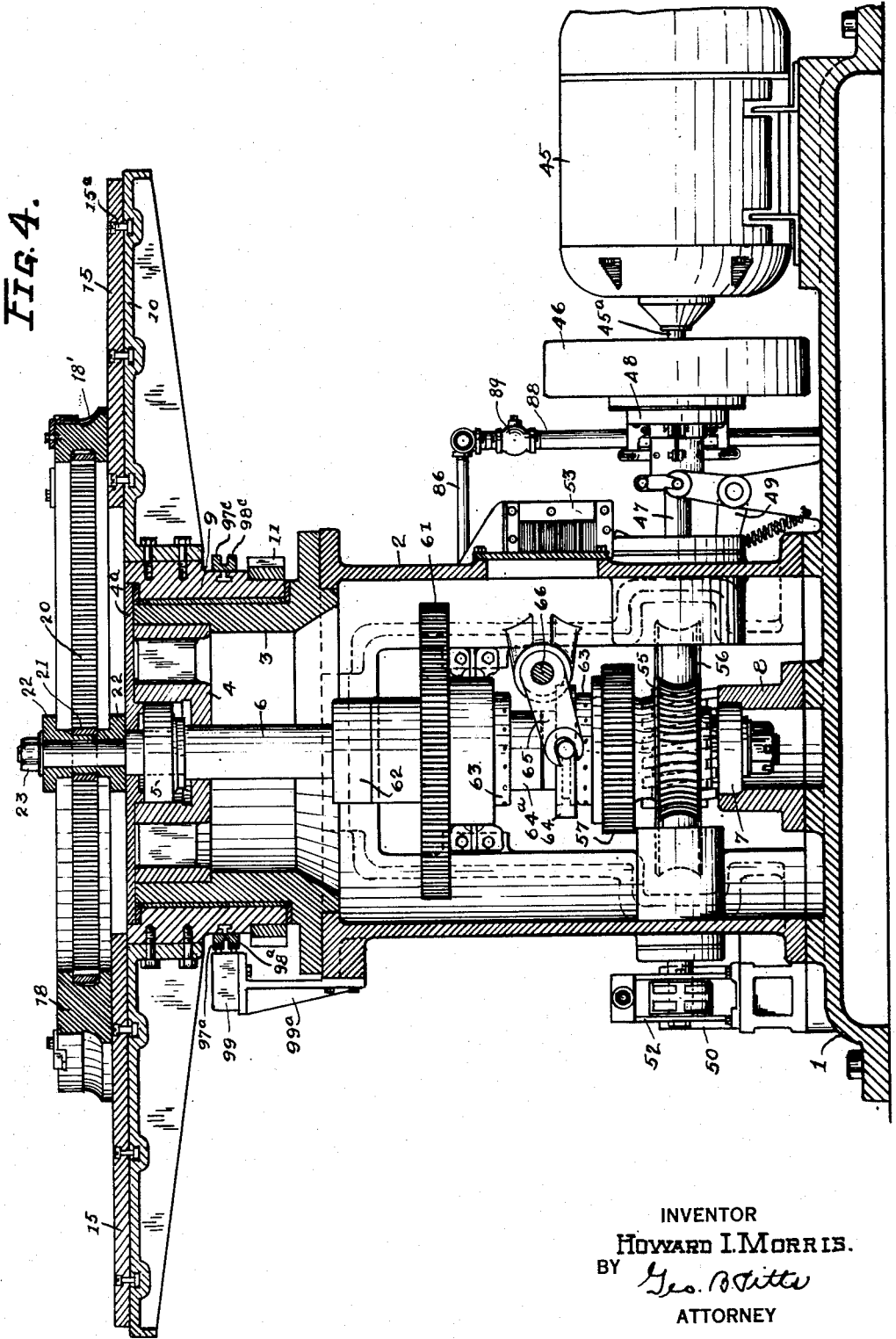

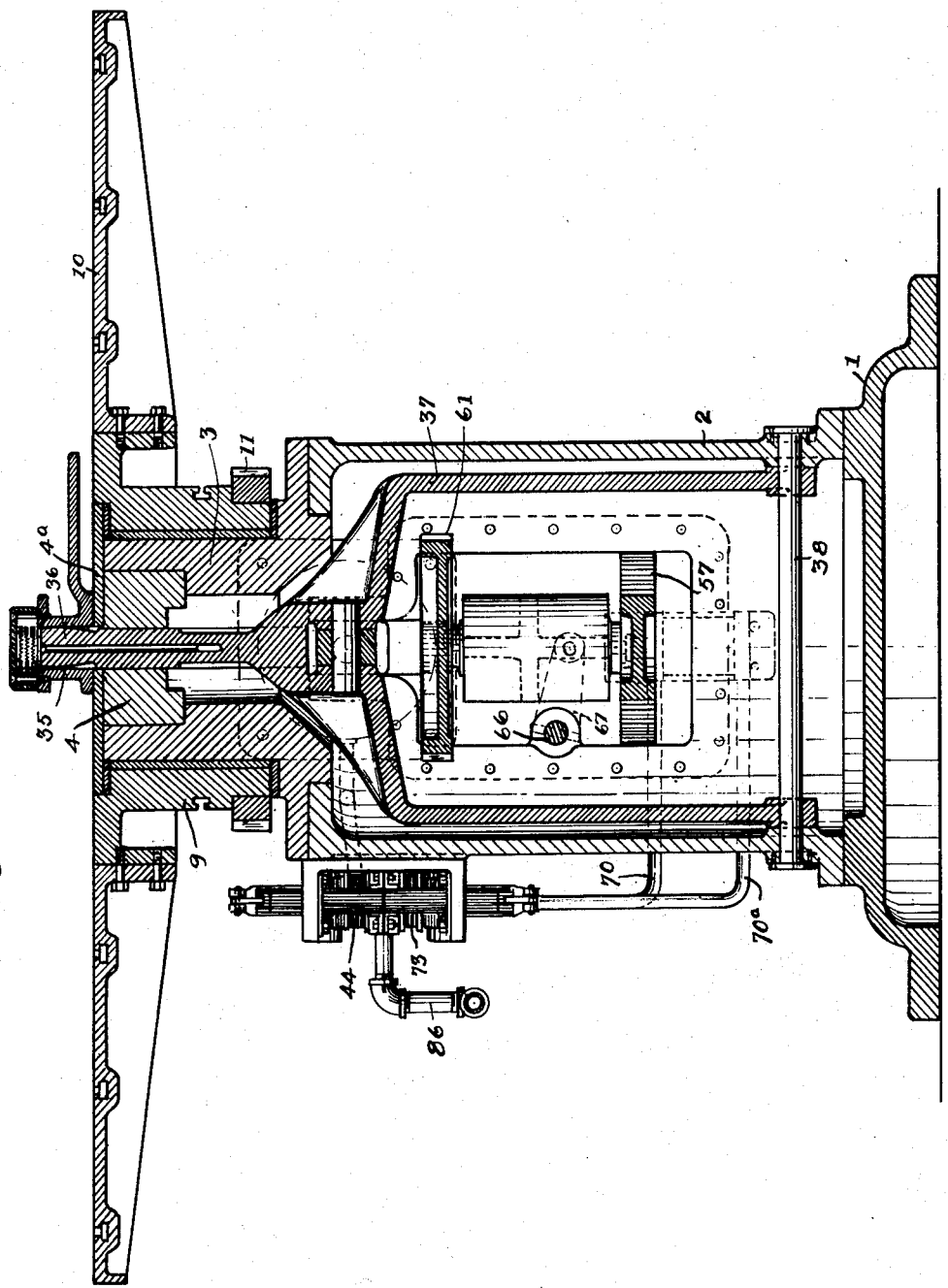

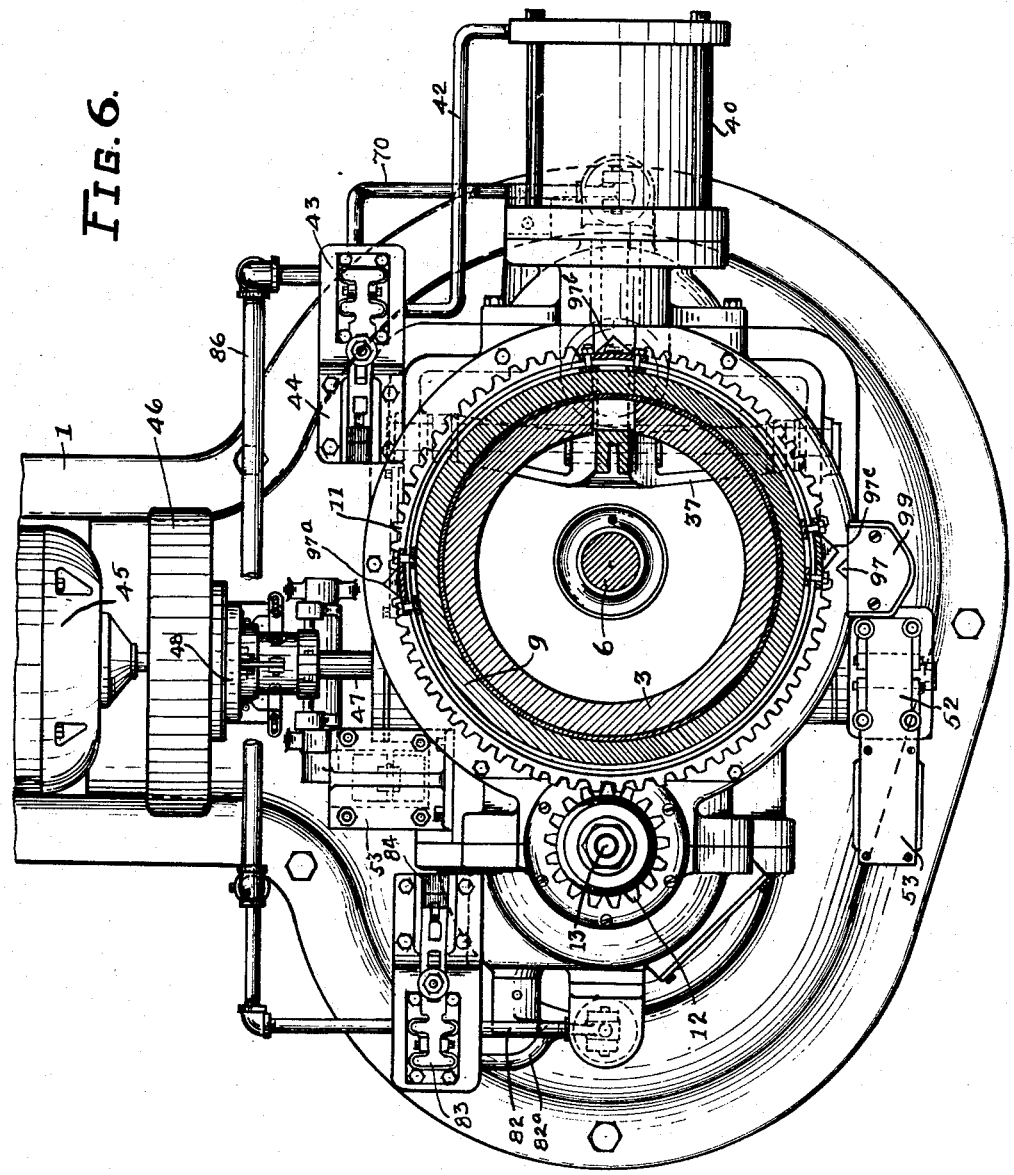

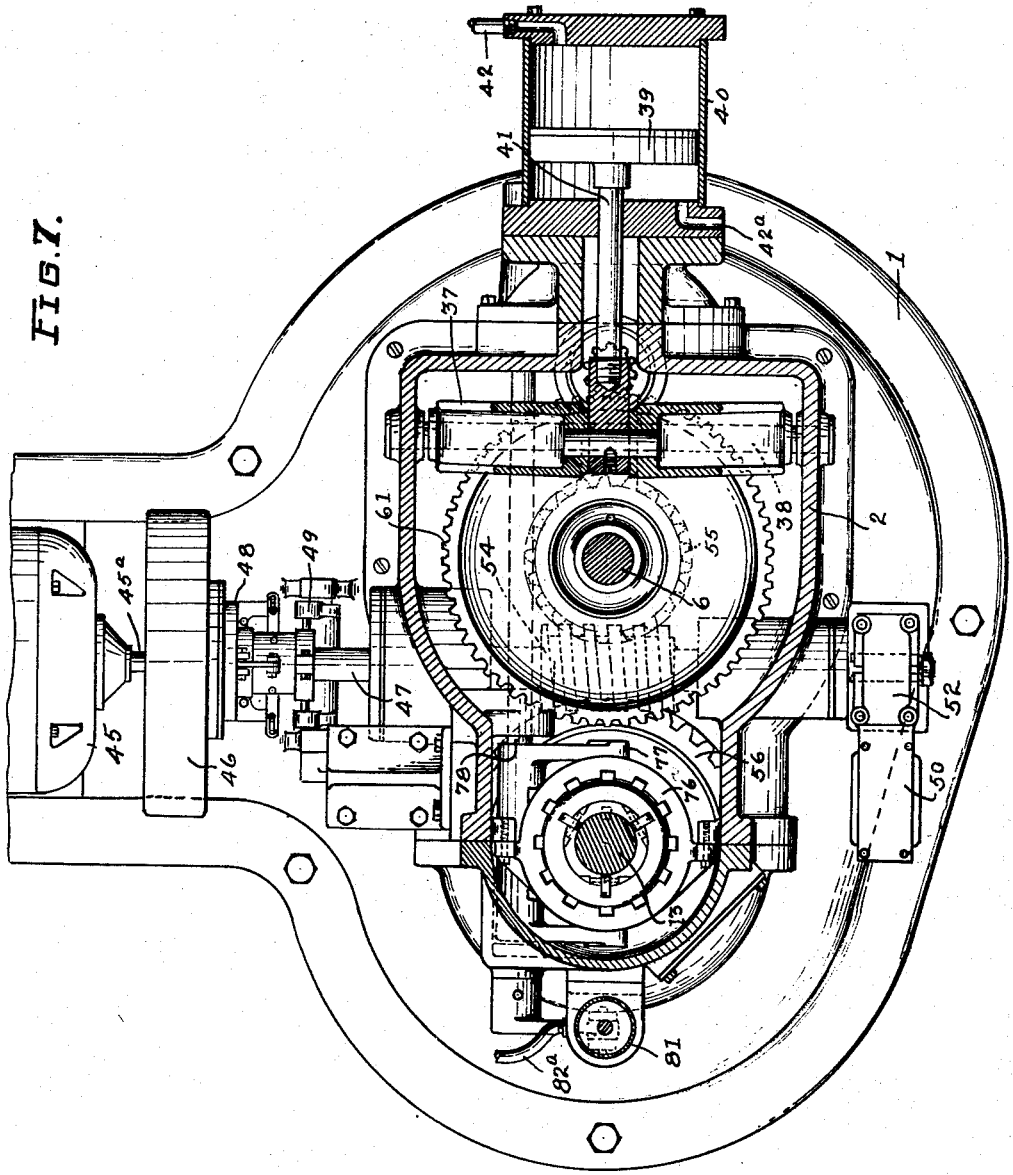

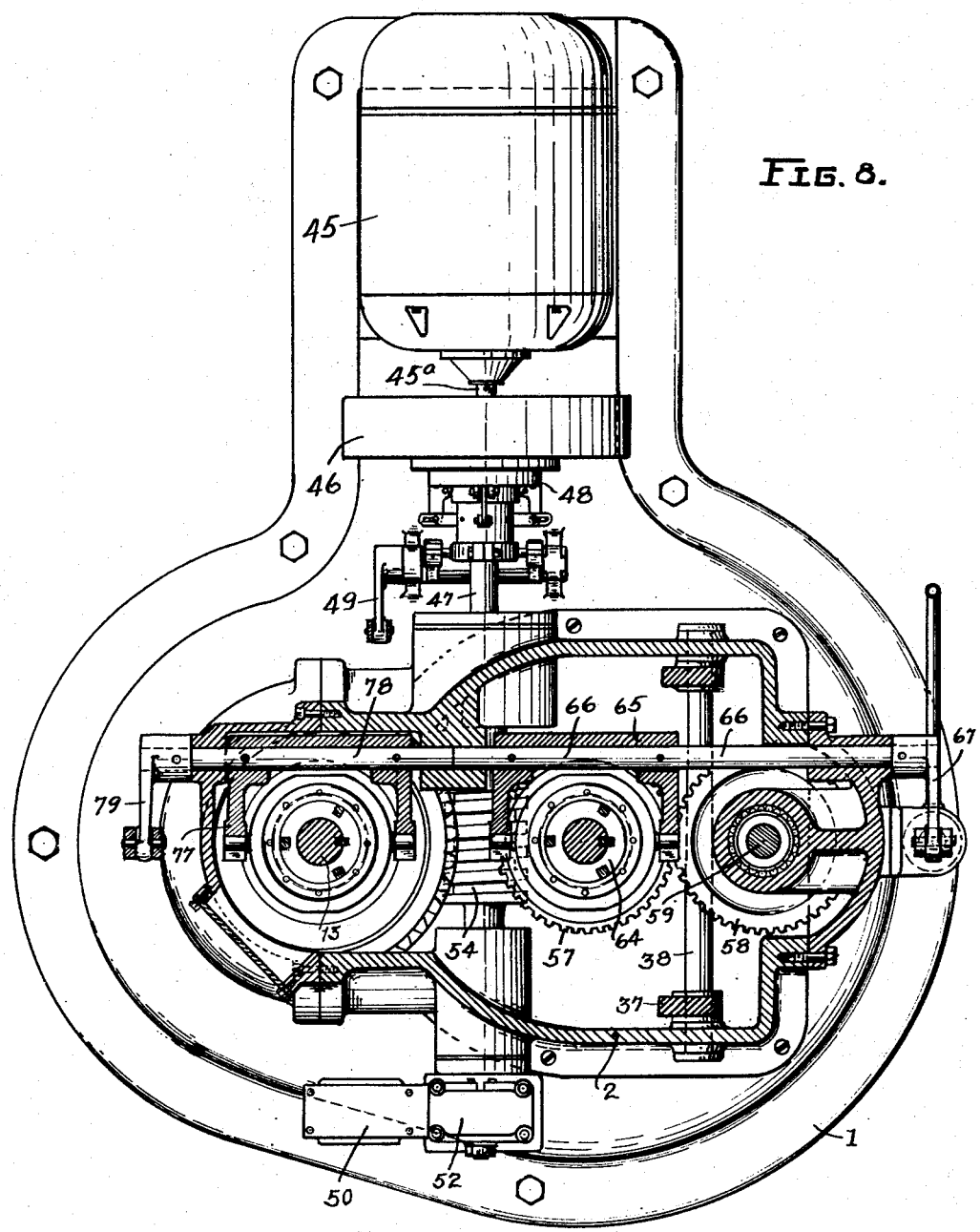

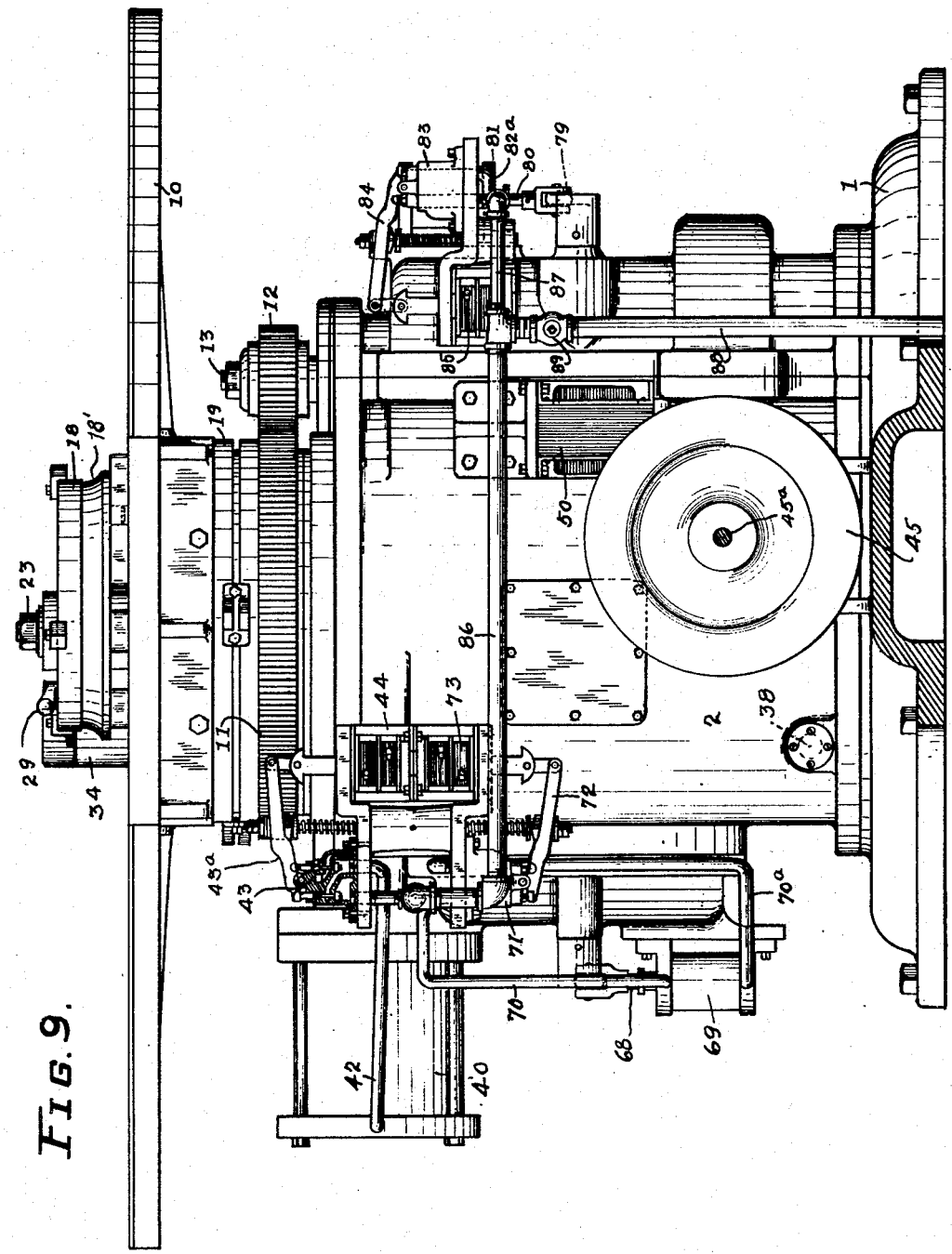

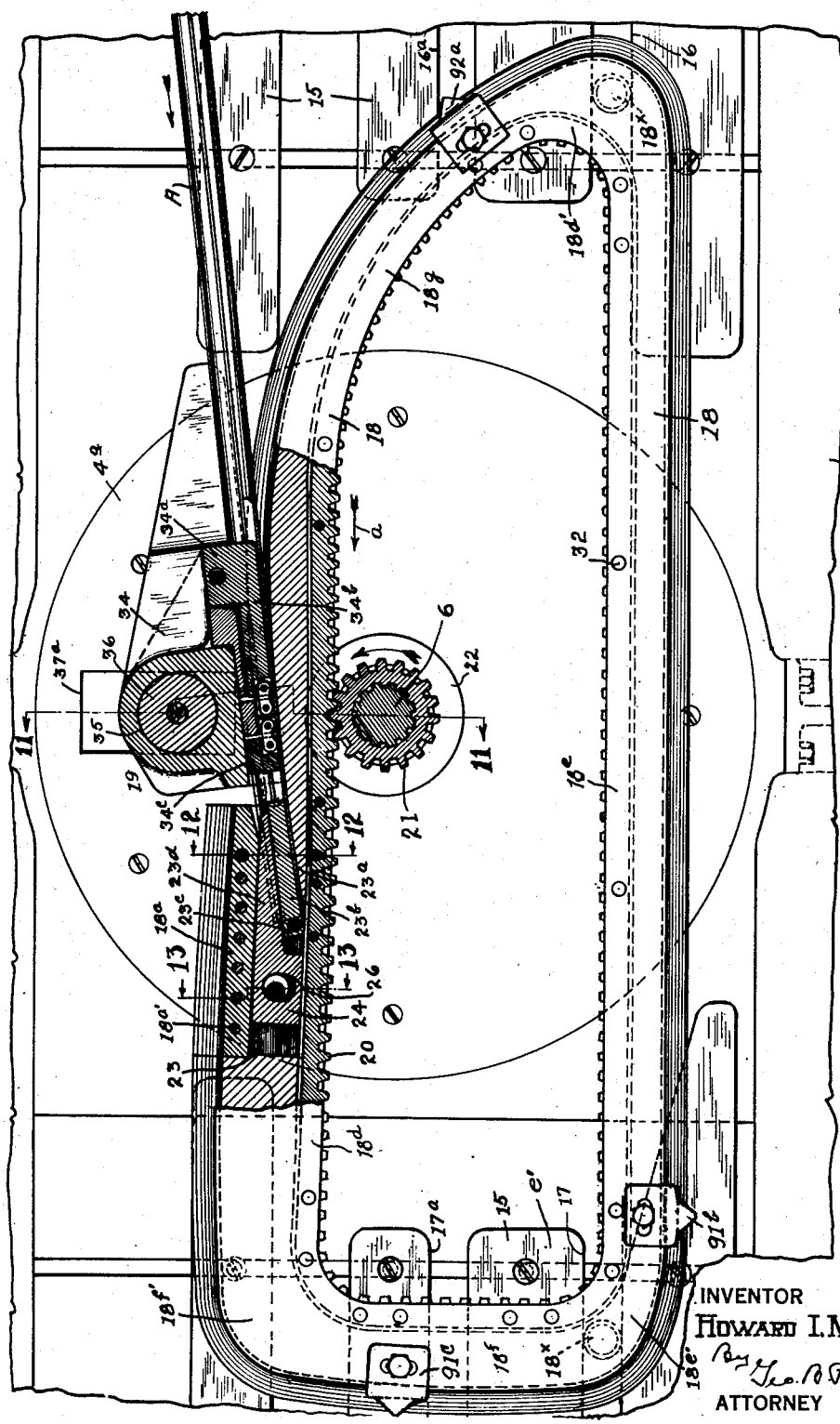

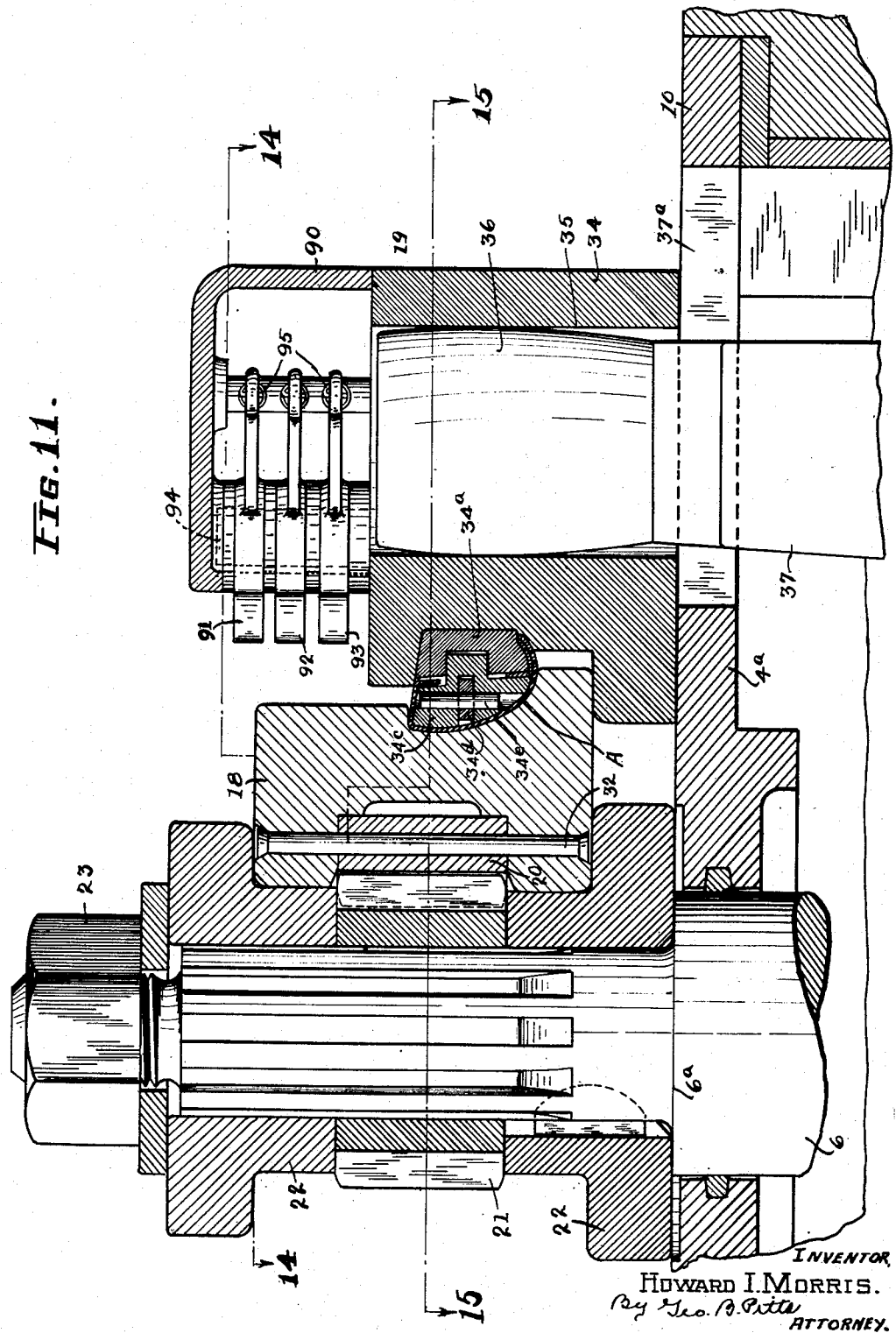

INVENTOR
HOWARD I. MORRIS.
BY
ATTORNEY

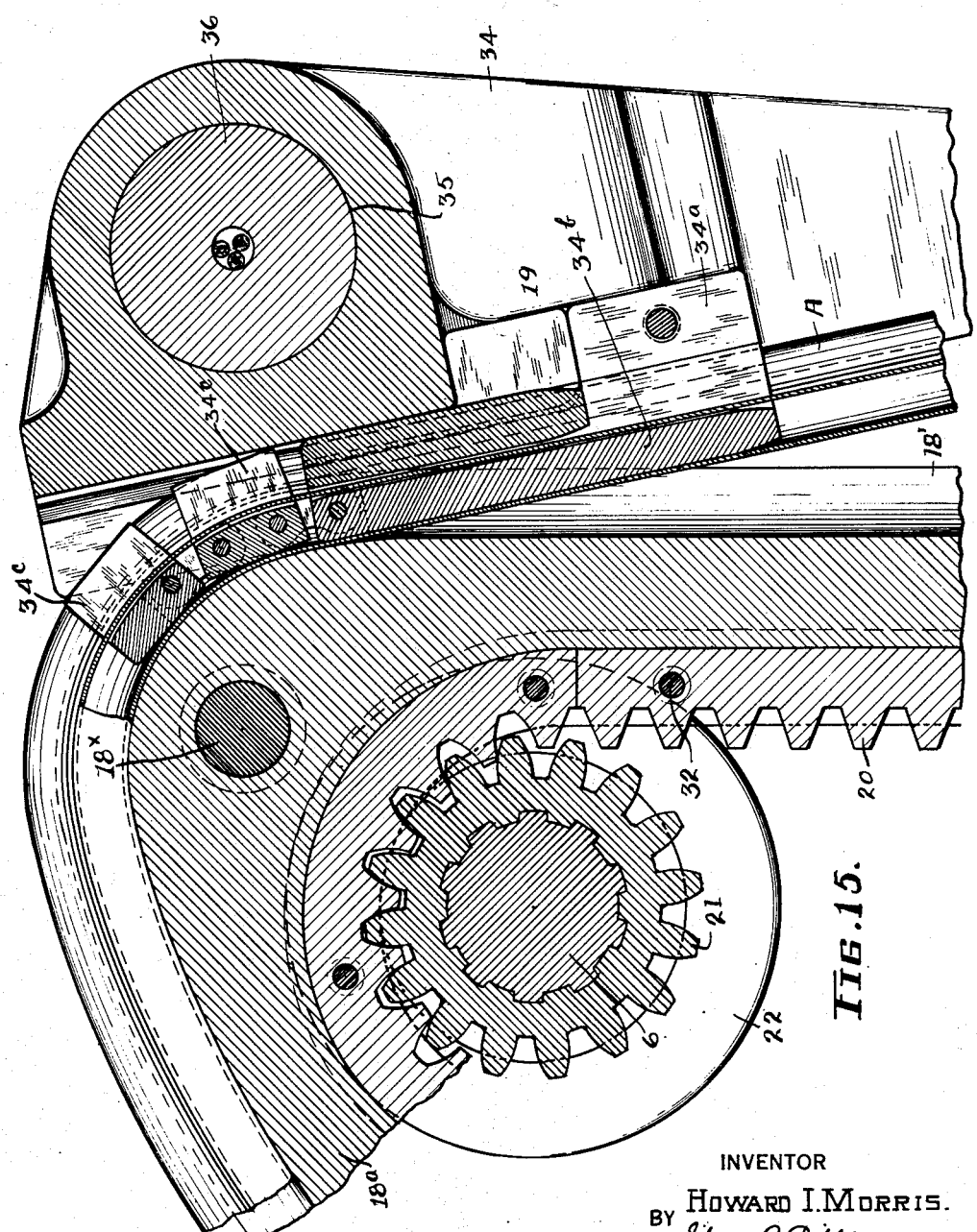

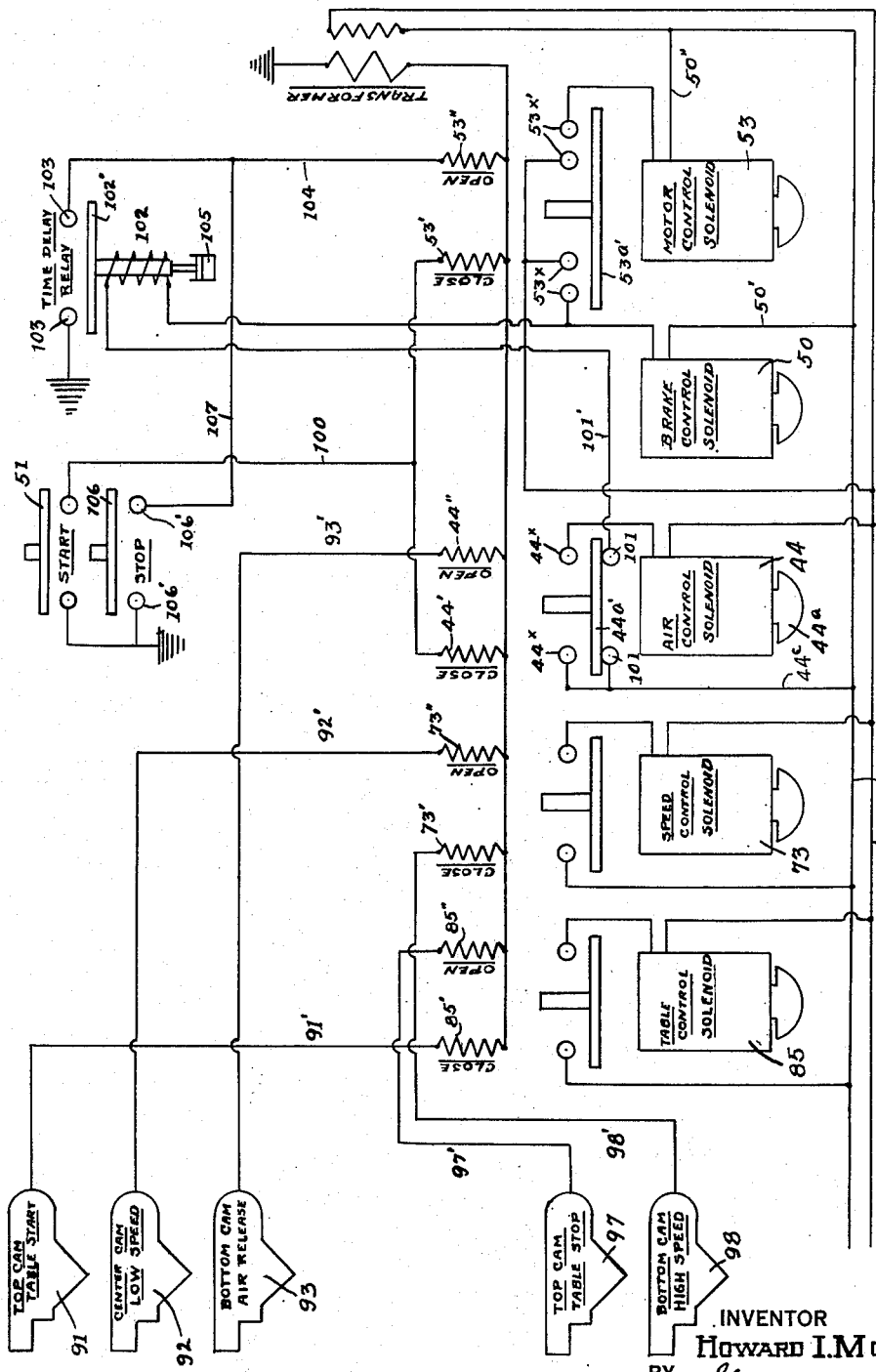

May 13, 1941.  H. I. MORRIS  2,241,414
FORMING MACHINE
Filed Oct. 24, 1936  18 Sheets-Sheet 16
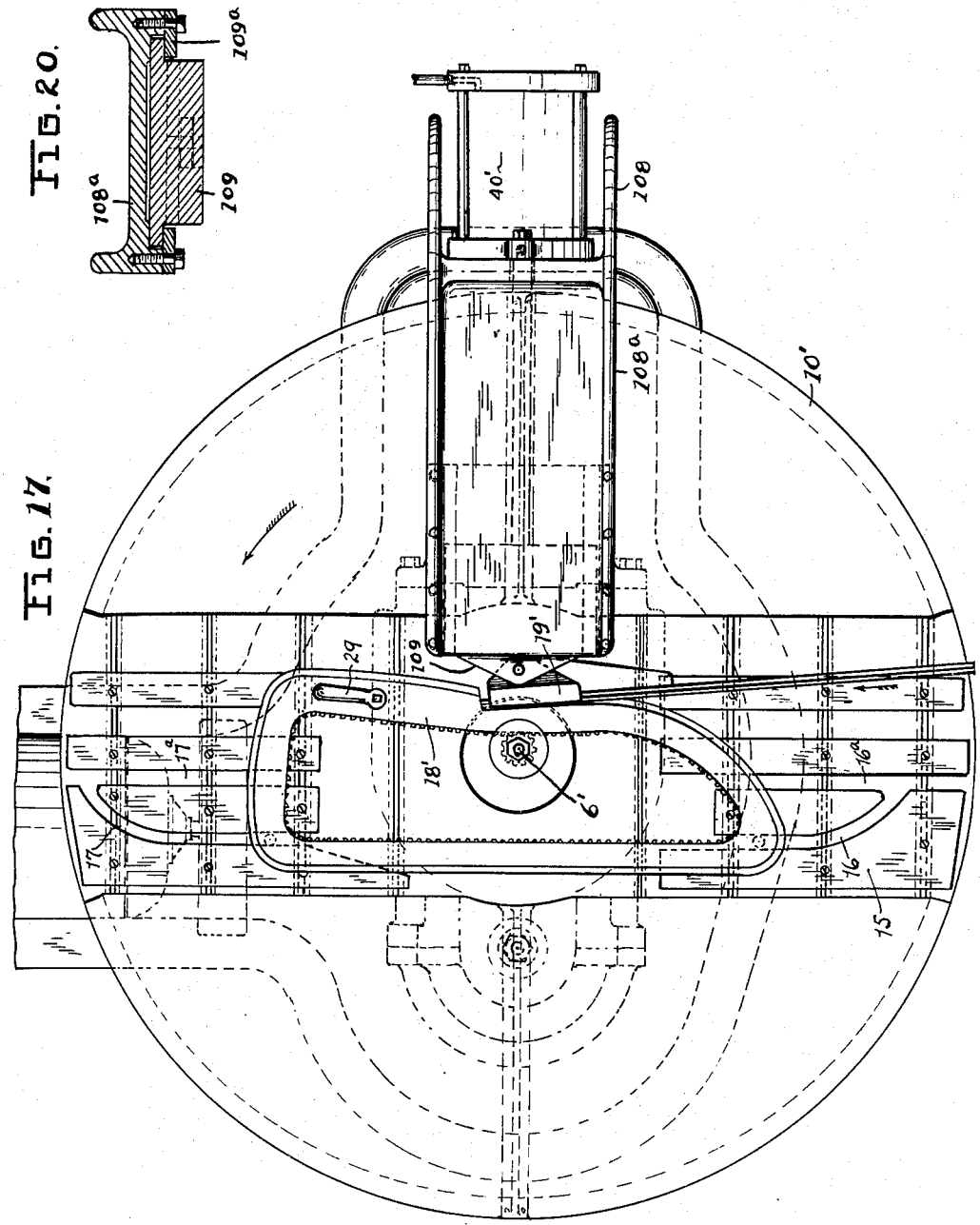
INVENTOR.
HOWARD I. MORRIS.
BY Geo. B. Pitts
ATTORNEY.

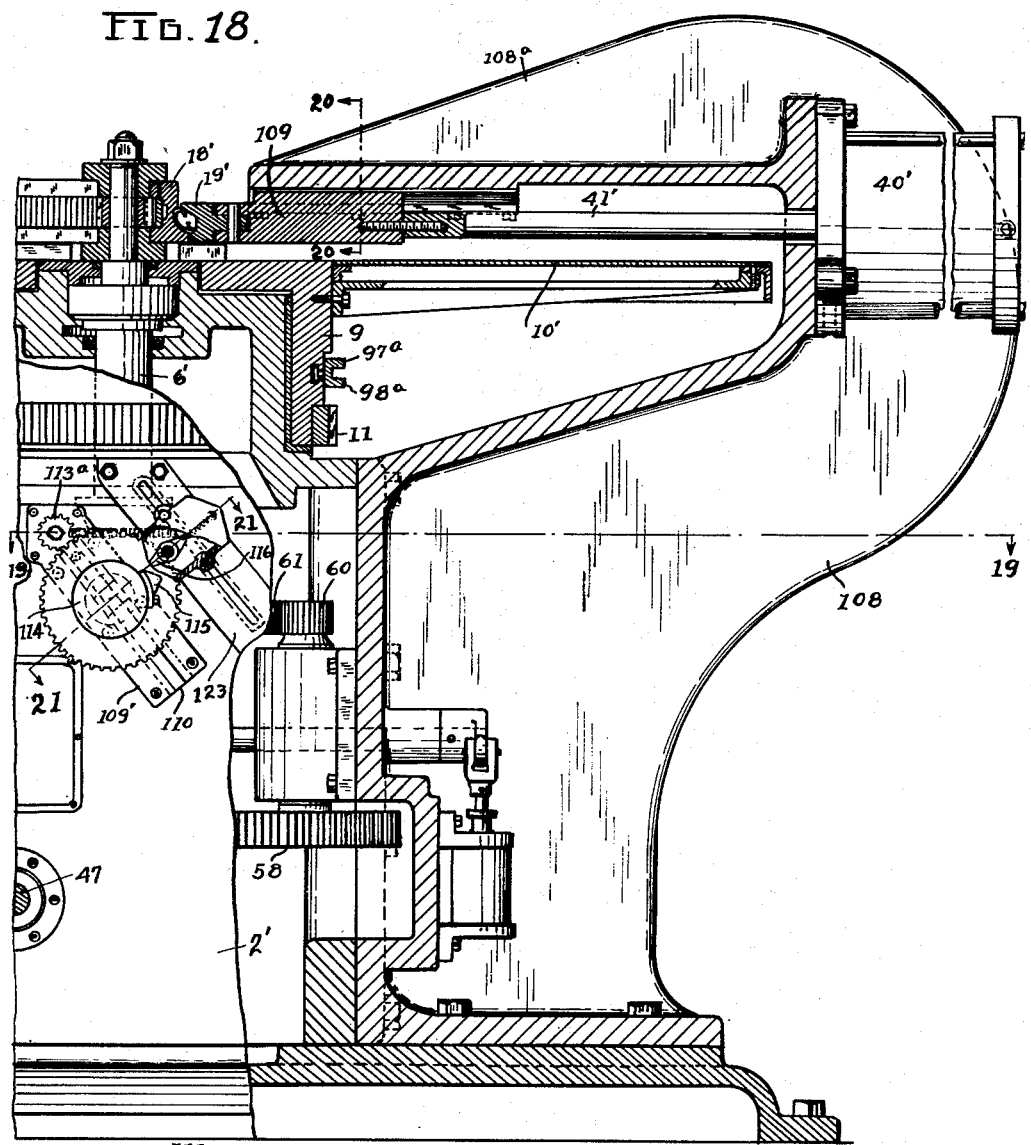
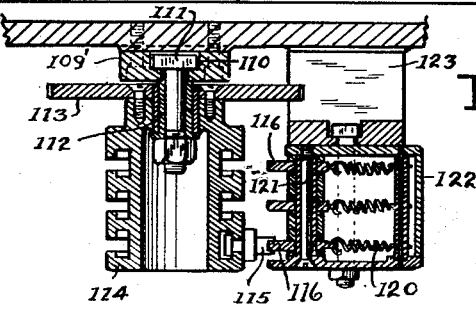

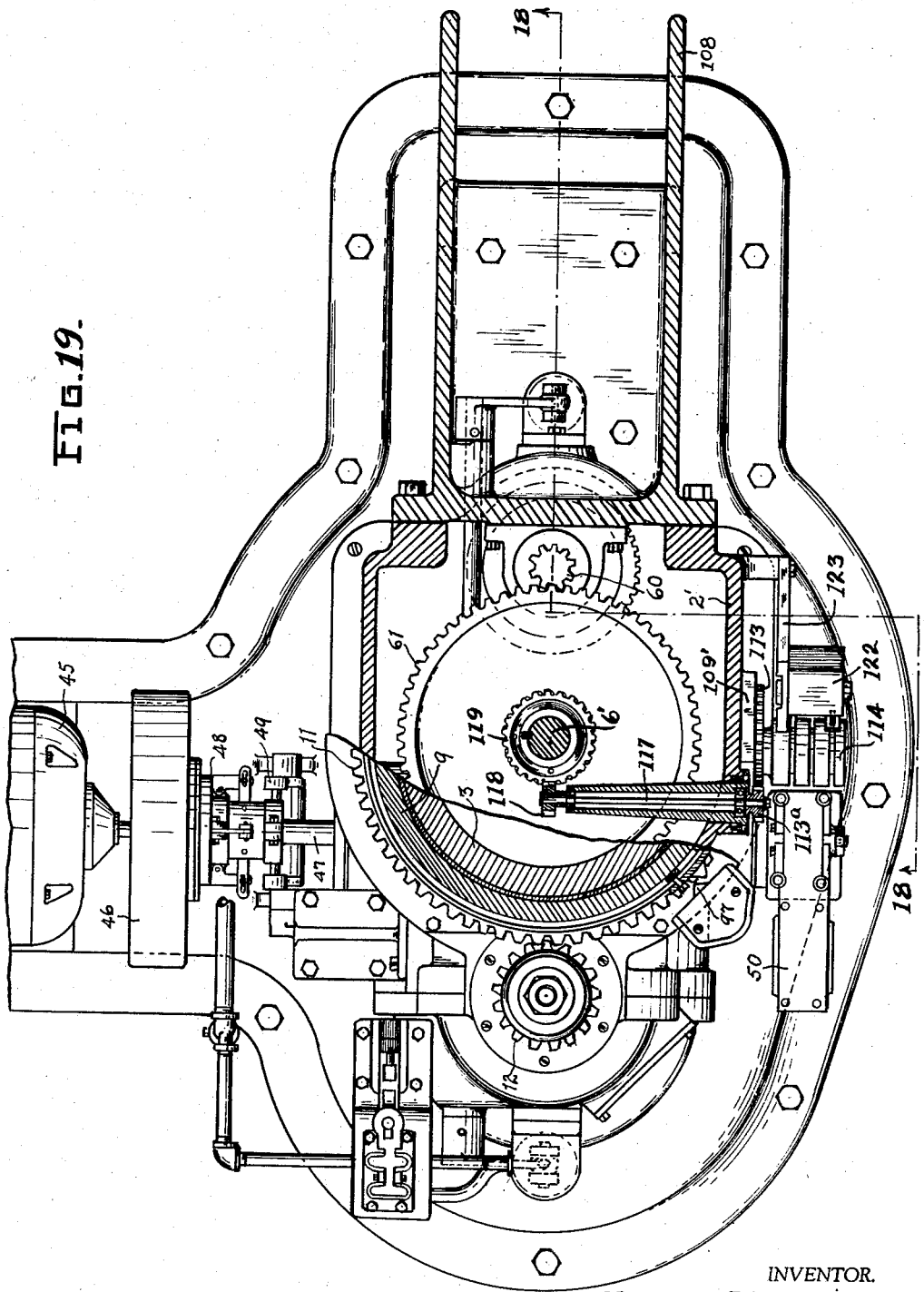

Patented May 13, 1941

2,241,414

UNITED STATES PATENT OFFICE 2,241,414

FORMING MACHINE

Howard I. Morris, Lakewood, Ohio, assignor to The Yoder Company, Cleveland, Ohio, a corporation of Ohio Application October 24, 1936, Serial No. 107,490

23 Claims. (Cl. 153—40)

This invention relates to a machine for forming or bending metal strip into curvilinear form. In the preferred application of the invention and as herein illustrated, the metal strip to be formed, has a pre-formed irregular cross sectional shape and the ends of each strip when it is formed are disposed end to end to permit their welding together, whereby the resulting form becomes a continuous member; although this end to end relation and pre-formed irregular cross sectional shape are not to be considered as limiting the invention in its broader aspects, both being the preferred arrangements. The machine herein illustrated is adapted to bend or shape strips or sections of metal stock into forms for various uses, for example, window sashes or frames for the bodies and doors of vehicles and the irregular cross sectional shape above referred to provides the seats or guides in a portion or throughout the length of the sash for the glass and seats for the beading or sealing material and other members which may be mounted in or related to the sash walls. But the terms sash or sash frames herein are used for purposes of description and are not intended as limitations of the invention or its applications.

One object of the invention is to provide a machine of this type arranged to shape stock into curvilinear form automatically, the curvilinear portions of which may be variously shaped for incorporation in any desired design and construction of support, such for example, the walls of a vehicle or a door frame therefor.

Another object of the invention is to provide a machine of this type that is relatively simple in construction and operates rapidly to shape the stock into final form.

Other objects of the invention will be apparent to those skilled in the art to which my invention relates from the following description taken in connection with the accompanying drawings, wherein Fig. 1 is a plan view of a machine embodying my invention.

Figs. 1a, 1b and 1c are diagrammatic plan views illustrating different positions of the table and die.

Fig. 2 is a section on the line 2—2 of Fig. 1.

Fig. 3 is an elevation on the line 3—3 of Fig. 2.

Figs. 4, 5, 6, 7 and 8 are sections on the lines 4—4, 5—5, 6—6, 7—7 and 8—8, respectively, of Fig. 2.

Fig. 9 is a section on the line 9—9 of Fig. 3.

Fig. 10 is a plan view and associated parts, enlarged, parts being broken away.

Figure 12:
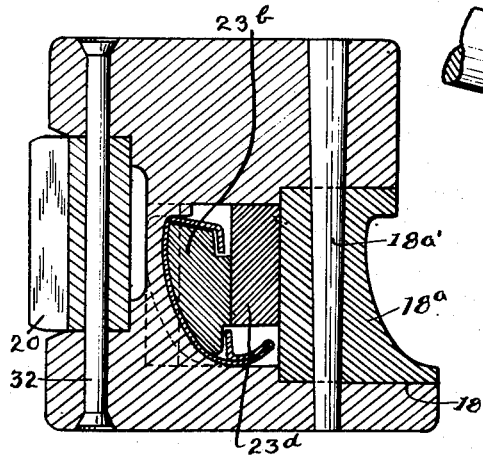
Figure 13:
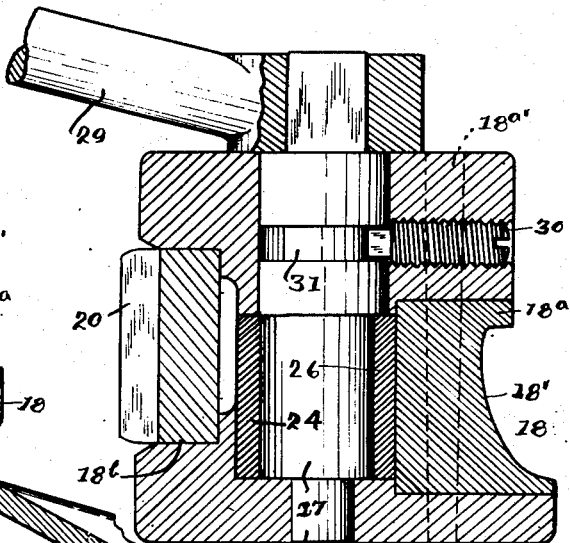

Figs. 11, 12 and 13 are sections on the lines 11—11, 12—12 and 13—13, respectively, of Fig. 10.

Figure 14:
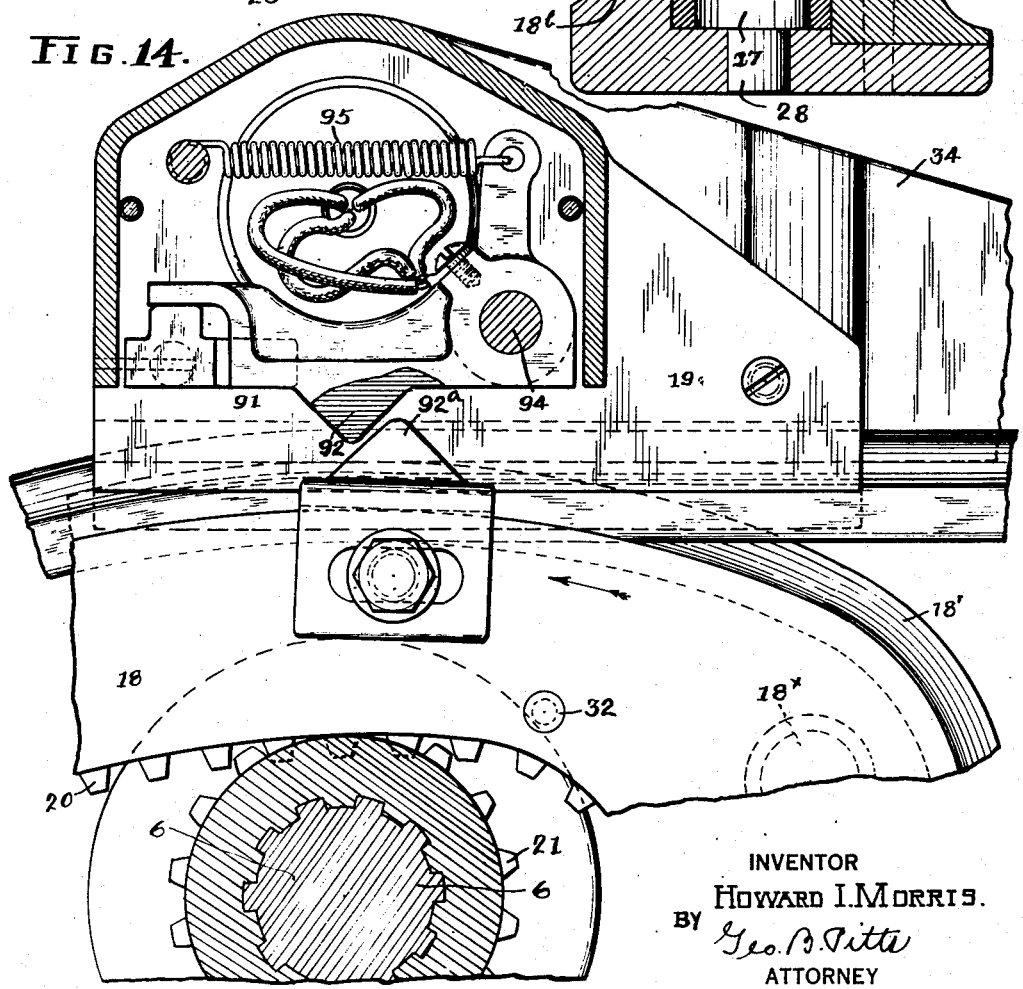

Figs. 14 and 15 are sections on the lines 14—14 and 15—15, respectively, of Fig. 11.

Fig. 16 is a diagram of the electric circuits.

Fig. 17 is a plan view of a modified form of construction.

Fig. 18 is a fragmentary view on the line 18—18 of Fig. 19.

Figs. 19, 20 and 21 are sections on the lines 19—19, 20—20 and 21—21, respectively, of Fig. 18.

In the drawings, 1 indicates a base which supports a hollow casting 2 having walls shaped to enclose and/or support various driving and operating parts and devices hereinafter referred to. The upper end of the casting 2 rigidly supports an annulus 3, in which is mounted, preferably adjacent its upper end, a support 4 having a chamber to receive anti-friction bearings 5 for the upper end portion of a main shaft 6, the lower end of the shaft being mounted in anti-friction bearings 7 seated in an annular boss 8. The support 4 has fixed to it a cover plate 4a. The exterior wall of the annulus 3 forms a bearing for the hub 9 of a table 10, which is preferably round as shown in Fig. 1, the hub 9 being rabbeted to receive the plate 4a. The hub 9 is provided with a ring gear 11, which is in mesh with a pinion 12, fixed to a drive shaft 13. The shaft 13 is mounted in suitable anti-friction bearings 14, 14' (see Fig. 2) and is driven as later set forth. Fixedly mounted on the table 10, at diametrical opposite sides thereof, are spaced plates 15 having opposed side walls forming between them guides or guide channels (those at one side being designated 16, 16a, and those at the opposite side being designated 17, 17a), which, through the co-action of pins 18x depending from a removable form or die, indicated as an entirety at 18 (the die being slidable on the plates), control or guide the movement of the die relative to the table 10 in co-operation with the rotary movements of the latter, as later set forth.

The plates 15 are secured to the table 10 by bolts 15a the table wall being formed with T-slots to receive the heads of the bolts 15a, whereby the plates may be relatively adjusted or others substituted to provide guide channels of different shape or in different positions dependent upon the shape of the die 18 and the section A to be formed thereon. The exterior wall of the die 18 is adapted to have connected to it a section of stock A of predetermined length, whereby the stock is, in effect, through the co-operation of a relatively stationary shoe, indicated as an entirety at 19, wrapped around the die 18 as the latter is operated, to impart to the stock a shape or form corresponding to that of the die. The inner wall of the die 18 is provided with a rack 20 which is engaged by a pinion 21, fixed to the shaft 6, the shaft being driven, as hereinafter set forth, in co-operative relation to the rotary movement of the table 10 to control the movement of the die. The shaft 6 is provided above and below the pinion 21 with flanged collars 22, the flanges of which engage the upper and lower surfaces of the die 18 to maintain it in operative relation to the pinion 21. The collars 22 and pinion 21 are secured in position against a shoulder 6a by a nut 23 threaded on the upper free end of the shaft 6 (see Fig. 11). The plates 15 serve to support the die 18 in the plane of the pinion 21 while bodily moving or swinging from one position to another position.

One side wall of the die 18 is formed with a recess 23 into which the forward end portion of a section A is positioned. The recess 23 is provided by cutting away the walls of the die and mounting thereon a wall 18a (see Fig. 10), which is fixed in position by pins 18a', the outer side of the wall 18a being arranged to form the active face of the die for that portion which is cut away. The inner wall of the recess, adjacent its open end, as shown at 23a, corresponds in cross section to the shape of the active face or wall of the die 18 and constitutes a continuation thereof. 23b indicates a core member loosely pivoted on a transverse pin 23c and adapted to telescopically fit within the inner end of the section A when the latter is inserted in the recess 23, the core member 23b having a cross section corresponding to the inner walls of the section A and adapted to be engaged through the open side of the latter by a wedge 23d to clamp the section against the wall 23a. The walls of the recess 23, inwardly of its open end, slidably support a block 24, the outer end of which carries the wedge 23d (being formed integrally therewith), and when moved endwise (to the right as viewed in Fig. 10) the wedge 23d operates through the member 23b to clamp the section A against the wall 23a, as just described. The block 24 is formed with a vertically arranged opening 26 in which an eccentric 27 revolves to move the block 24 into and out of clamping position; the eccentric being fixed to a shaft 28, mounted at its opposite ends in bearings provided in the walls of the die, as shown in Fig. 13. The upper end of the shaft 28 is engaged by a crank or other device 29, whereby it may be rotated. The shaft 28 is held against endwise movement by the inner end of a screw 30 which fits into an annular groove 31 formed in the shaft.

The die 18 comprises a member the outer side wall of which preferably consists of substantially straight and curvilinear portions forming the active die faces 18'. The inner side wall of the die 18 is formed with a recess 18b which serves as the seat for the rack 20. The rack 20 is formed in sections (see Fig. 15) to permit its assembly. The sections of the rack 20 are preferably fixed in position by pins 32 riveted at their opposite ends.

The shaft 6 is driven at different speeds during the movement of the die 18 relative to the shoe 19, preferably two speeds; that is, as the sides 18d, 18e and end 18f of the die move relative to the shoe 19, through the engagement of the pinion 21 with the rack 20, the shaft 6 is driven at the higher speed, whereas as the curved portions 18d', 18e', 18f' of the die 18 move relative to the shoe 19 the shaft 6 is driven at the lower speed, it being noted that as each corner of the die 18 and curved portion 18g moves relative to the shoe 19, the table 10 is rotated a predetermined angular distance, whereby the die 18 is bodily moved substantially about the axis of the shaft 6 and simultaneously moved relative to the shoe 19.

The driving means for the table 10 is controlled in the manner and by mechanism, later described, to effect rotation of the table in correlation to the movement and successive positions of the die 18.

The shoe 19 comprises the following: 34 indicates a supporting member slidably mounted on the plate 4a, whereby it may be positioned in operative relation to the die 18 under pressure, and moved to an inoperative position, to permit the engagement of a section A with the die 18 and the removal of the formed section. The member 34 is formed with an opening 35 to receive the upper end 36 of a lever 37, the latter extending through an elongated opening 37a formed in the plate 4a. The lower end portion of the lever 37 is preferably bifurcated (see Figs. 2, 5 and 8) and pivoted on a shaft 38, the latter being supported as shown in Figs. 5 and 8. The upper end 36 of the lever 37 is of curvilinear shape to provide a pivotal slidable connection with the walls of the opening 35. The lever 37 may be operated by any suitable means, but preferably by fluid pressure operating on a piston 39 within a cylinder 40, the piston being connected to the lever 37 by a rod 41. In this arrangement the shoe 19 is held in yielding engagement with the section A to compensate for the larger radius of the die 18 at its corners. On its forward side, the member 34 is provided with a bar 34a having on its outer side a core member 34b corresponding in cross section to the cross section of the inner walls of the section A, the core member 34b having connected to it a plurality of shoe elements 34c. (See Fig. 15.) As shown, the elements 34c are connected to each other and the inner one is connected to the core member 34b so that they may articulate relative to each other to effect curving of the section A around the curved portion 18g and corners 18d', 18e', 18f' of the die (see Fig. 15); such connections preferably consisting of links 34d pivoted at their opposite ends on pins 34e suitably mounted in the elements 34c and member 34b. The fluid under pressure (such as compressed air) is supplied to the outer end of the cylinder and discharged therefrom through a pipe 42, air on the opposite side of the piston being exhausted through the duct 42a. The supply and discharge of the fluid are controlled by a suitable four-way valve 43, the latter being connected to a lever 43a which is actuated by a suitable solenoid 44. The core 44a of the solenoid 44 is operated in one direction by a spring (not shown) and in the opposite direction when the coil of the latter is energized by the closing of a circuit 44c across contacts 44x from the mains 44b, 44b', in which the coil of the solenoid is connected. The switch element 44a' for closing the circuit across the contacts 44x and breaking such circuit is connected to and operated by the core of one solenoid 44' of a relay and locked in operated position by a spring controlled rocker (not shown) until the coil of the other solenoid 44'' of the relay is energized, the effect of which is to operate the rocker and permit the return of the core 44a to its original position. The solenoid 44 and solenoids 44', 44'', of the relay are shown diagrammatically in Fig. 16 and may be of any well known construction, for which reason they are not illustrated in detail. When the fluid is supplied to the cylinder 40, the lever 37 is moved to the left, as shown in Figs. 5, 6 and 7, to move the shoe 19 into operative position, the pressure exerted on the piston 39 serving to maintain the shoe 19 in yielding engagement with the section A. At the end of the shaping operation, the solenoid 44'' is automatically operated, as later set forth, whereby the coil of the solenoid 44 is de-energized so that its core moves to its first position, whereby the valve 43 is operated to cut off the fluid supply and permit the discharge of the fluid from the cylinder 40. Upon the release of the pressure on the piston 39, the shoe 19 and lever 37 may be swung away from the die 18 to permit the removal of the formed section and the engagement of a new section with the die 18. It will be obvious that the lever 37 may be positively actuated in both directions, as by means of a double acting cylinder and a suitable control valve therefor.

The driving means for the shafts 6 and 13 comprise the following: 45 indicates an electric motor mounted on the base 1 and having fixed to its shaft 45a a flywheel 46. The shaft 45a is drivingly connected to a shaft 47 by a suitable clutch 48, the latter being operated by linkage 49, connected to the core of a solenoid 53. The solenoid 53 and the solenoids 53', 53'' of the relay (see Fig. 16) for controlling its operation, are similar in construction and operation to the solenoid 44 and solenoids 44', 44'', already described. The shaft 47 is mounted in suitable bearings and at its outer end it is provided with a brake wheel engaged and disengaged by suitable shoes (the wheel and shoes being mounted in a casing 52) which are connected to and operated by the core of a solenoid 50. The solenoid 50 is controlled as later set forth. The shaft 47 is provided with a worm 54 which meshes with a worm gear 55 loose on the shaft 6 and a worm gear 56 loose on the shaft 13. 57 is a gear keyed to the hub of the worm gear 55 and in mesh with a gear 58 which is fixed to the lower end of a jack shaft 59, the upper end of the latter having fixed to it a pinion 60. The pinion 60 meshes with a gear 61 loosely mounted on the shaft 6 between the flange of a bushing 61a and a collar 62. Each of the gears 57 and 61, on its inner face is provided with an annular collar 63 containing a set of clutch discs alternately connected to the adjacent collar and a hub 64a fixed to the shaft and arranged to be locked together by a ring 64. The ring 64 is arranged to slide on the hub 64a and through a key and a lever (not shown) associated with each set of disks, to lock the adjacent set of disks together and effect a driving connection between the adjacent gear and hub, that is, when the clutch operating ring 64 effects disengagement of the clutch disks for one gear it effects engagement of the clutch disks for the other gear, and vice versa, to drive the shaft 6 at the higher or lower speed. When the shaft 6 is drivingly connected to the gear 57, it is driven at the higher speed, the drive being from the shaft 47 through the worm 54, worm gear 55, gear 57 and the adjacent set of clutch disks and hub 64a. When the shaft 6 is drivingly connected to the gear 61, it is driven at the lower speed, the drive being from the shaft 47 through the worm 54, worm gear 55, gear 57, gear 58, shaft 59, pinion 60, gear 61 and the adjacent set of clutch disks and hub 64a. The operation of the ring 64 to either driving position is effected by a yoke 65 fixed to a rock shaft 66, the outer end of which is provided with an arm 67. The arm 67 is connected to the rod 68 of a piston mounted in a cylinder 69. The opposite ends of the cylinder are connected to the fluid pressure supply by pipes 70, 70a, the flow therethrough to and from the cylinder being controlled by a suitable four-way valve 71 connected by a lever 72 to and operated by a solenoid 73 (see Fig. 9), as later set forth. The solenoid 73 and the solenoids 73', 73'' of the relay (see Fig. 16) for controlling its operation are similar in construction and operation to the solenoid 44 and solenoids 44', 44'', already described. The gear 56 is keyed to a clutch device 74 which is provided with an annular collar 75 containing a set of clutch disks alternately connected to the collar and a hub 75a keyed to the shaft 13 and adapted to be locked together by the movement of a ring 76a, slidable on the hub and operating through a slide or key 76b and a lever 76c, to connect the clutch device 75 to the shaft 13. When the ring 76a is moved in the opposite direction on the hub 75a, it operates to lock together a separate set of clutch disks, alternately connected to the hub 75a and a stationary annulus 75', the effect of which is to stop the rotation of the shaft 13. Accordingly by controlling the movement of the ring 76a, the table 10 may be started and stopped at predetermined positions. 76 indicates an adjusting ring on the hub 75a. The ring 76a is operated by a yoke 77 fixed to a rock shaft 78. The outer end of the shaft 78 is provided with an arm 79 which is connected to a rod 80 for the piston in a cylinder 81. The opposite ends of the cylinder 81 are connected to the fluid pressure supply by pipes 82, 82a, the flow therethrough to and from the cylinder being controlled by a suitable four-way valve 83 connected by a link 84 to and operated by a solenoid 85, as later set forth. The solenoid 85 and the solenoids 85', 85'', of the relay (see Fig. 16) for controlling its operation, are similar in construction to the solenoid 44 and solenoids 44', 44'' already described. For reasons which will later appear, the shaft 13 is driven at that speed which will rotate the table 10 at a speed unequal to that of the shaft 6 when the latter is driven at the lower speed.

The fluid employed for the cylinders 40, 69 and 81 preferably comprises air under pressure, the inlet for the valves 43, 71 and 83 being connected by pipes 42 (already referred to), 86 and 87 to a main supply pipe 88. The pipe 88 is provided with a cut-off valve 89.

Provision is made for controlling the driving of the shafts 6, 13, whereby the contiguous portions of the die are successively advanced relative to the shoe 19 throughout the entire length of each section A to be formed, such control being dependent upon the predetermined shape of the die. As will be understood, the shape herein shown is merely illustrative of one example. The movement of the die 18 may be controlled by different mechanism from that herein disclosed, but by preference such control is effected by electrical means for which reason the disclosure of the operating means for the lever 37 and clutch ring 48, 64 and 76a include the solenoids 50, 44, 73 and 85, which are controlled by relays as illustrated diagrammatically in Fig. 16. As will be understood, the die 18 is continuously moved from its starting position (Figs. 1 and 10) until the entire length of its shaping wall moves relative to the shoe, this movement being effected in the present disclosure by the pinion 21 and rack 20 and these elements conjointly with the rotation of the table at predetermined positions of the die. During the movement of the die sides 18d, 18e and end 18f relative to the shoe 19 the die slides on the plates 15, being guided in such movement by the engagement of the guide pins 18x with the walls of the guide channels 16, 16a, 17, 17a; during such movement the table 10 remains stationary. During the movement of the curved portions 18d', 18e', 18f', 18g, of the die 18 relative to the shoe 19 the table rotates predetermined angular distances, the die 18 moving with the table as shown in Figs. 1a, 1b and 1c to position its respective rearward advancing portions in operative relation to the shoe. In the preferred arrangement, as already described, the pinion 21 is driven at a high speed and a low speed, the high speed being effected when the sides 18d, 18e, end 18f (which portions are substantially straight) and 18g move relative to the shoe 19 to insure quick operation and the low speed being effected while the curved portions 18d', 18e', 18f' of the die move relative to the shoe 19; but it will be understood that if desired the pinion 21 may be driven at the latter speed throughout the entire shaping portions of the die.

In this preferred arrangement, I provide on a driven or movable part or parts a plurality of devices each adapted to engage a related device mounted on a stationary support or supports, whereby the engagement of each device with its related device closes an electrical circuit for a coil of one of the relay solenoids. In one form of construction, as shown in Figs. 18, 19 and 21, the movable devices (or certain thereof) are mounted at predetermined positions on the periphery of a rotatable device 114 driven in the manner later set forth; but in the arrangement shown in Figs. 1, 2, 4, 6, 9, 10, 11, 12, 13, 14, 15 and 16, certain of the movable devices are carried by the die 18 and the remaining movable devices are carried by the hub 9 for the table 10 and consist of the following: 90 indicates a housing mounted on the supporting member 34 and enclosing a plurality of pivoted contact devices, three such devices indicated at 91, 92, 93, being provided in the arrangement required for the exemplified predetermined form of sash herein illustrated (see Figs. 11 and 14). The device 91 is arranged to be engaged by devices 91a, 91b, 91c, adjustably and removably fixed to the die 18, at predetermined positions, each thereof serving to close an electrical circuit 91', the effect of which is to rotate the table 10; the device 92 is arranged to be engaged by devices 92a, 92b, 92c, adjustably and removably fixed to the die 18, at predetermined positions, each thereof serving to close an electrical circuit 92', the effect of which is to change the speed of the shaft 6 from high speed to low speed and the device 93 is arranged to be engaged by a device 93a adjustably and removably fixed to the die at a predetermined position and serving to close an electrical circuit 93', the effect of which is to stop the shaft 6 and release the shoe 19. The devices 91a, 91b, 91c are mounted to aline with the device 91 in the movement of the die; the devices 92a, 92b, 92c are mounted to move in a plane corresponding to that of the device 92; and the device 93a is mounted to move in a plane corresponding to that of the device 93. The device 92b is disposed at the same position on the die as the device 91b and this is also true of the devices 91c and 92c, since the change to low speed of the shaft 6 and start of the table 10 to rotate are effected at the same time, as later set forth. The contact devices 91, 92, 93, are independently pivoted on a stud shaft 94 and each (a) preferably comprises a long arm having a projecting cam portion with which the related contact devices on the die 18 engage and a short arm connected to a spring 95 which normally maintains the long arm in operative position against a stop 96 and (b) connected to a lead as shown in Fig. 14, of the adjacent circuit. 97, 98, indicate a plurality of contact devices mounted and constructed similarly to the devices 91, 92, 93, in a housing 99 supported by a bracket 99a on the casting 2 (see Figs. 3 and 4). The device 97 is arranged to be engaged by contact devices 97a, 97b, 97c, adjustably and removably fixed to the table hub 9 at predetermined angular positions and movable therewith in the plane of the device 97, each thereof serving to close an electrical circuit 97', the effect of which is to stop the rotation of the table and the device 98 is arranged to be engaged by contact devices 98a, 98b, 98c, adjustably and removably fixed to the table hub 9 at predetermined positions and movable therewith in the plane of the device 98, each thereof serving to close an electrical circuit 98', the effect of which is to shift the clutch ring 64 and change the speed of the shaft from low to high speed.

*Operation.*—After the forward end of a section of stock A of predetermined length has been secured to the die 18, the latter is moved on the plates 15 by the pinion 21 and rack 20 until the entire length of the die has moved relative to the shoe 19, the effect of which is to press the section A into engagement with the active face of the die, whereby the section is provided with a contour similar to that of the die. In the arrangement and construction disclosed, the section A has a preformed cross sectional shape, which is maintained by the section when formed on the die 18; but it will be obvious that the die 18 and shoe 19, in addition to their co-active functioning to wrap the section around the die, may also, by incorporating therewith suitable dies or forming rolls, co-act to impart to the section a cross section of any desired shape. To start the machine, the switch 51 is operated to close a circuit 100, the effect of which is to energize the coils of the solenoids 44', 53', which operate the switch elements 44a' and 53a' to (a) close the circuit across the contacts 44x, whereby the solenoid 44 is operated to position the shoe 19 and (b) close the circuits 50', 50'', across the contacts 53x and 53x' whereby the solenoids 50 and 53 are operated, the former releasing the brake and the latter connecting the motor shaft 45a to the shaft 47. As the clutch ring 64 is engaged with the clutch elements of gear 57, the shaft 6 is driven at high speed and the die 18 starts to move in the direction of the arrow *a* (Figs. 1 and 10) to advance the die side 18d relative to the shoe 19. During this movement, the contact device 91a engages the contact device 91 and closes the circuit 91', the effect of which, through the solenoid 85' and solenoid 85, is to move the clutch ring 76a into engagement with the clutch elements of gear member 74 to effect rotation of the table 10; with these connections made, the curved portion 18g of the die 18 moves relative to the shoe 19, the die being guided by the pins 18x in the guides 16, 17, and the table 10 rotates to the position shown in Fig. 1a; as a result of this movement of the die, the contact device 92a, which is arranged at a position in advance of the die corner 18d', engages the related device 92, closing the circuit 92', the effect of which, through the solenoid 73" and solenoid 73, is to shift the clutch ring 64 into engagement with the clutch disks of the gear 61, whereby the shaft 6 is driven at its low speed, as the die is swung about the axis of the pinion to position its side 18e in relation to the shoe 19. In the rotary movement of the table 10, the contact devices 97a, 98a, engage the contact devices 97, 98, respectively, the effect of which is to close the circuits 97', 98', which, through solenoids 85", 73' and solenoids 85, 73, stop the rotation of the table and shift the clutch ring 64 to change the speed of the shaft to high speed. The die side 18e then moves relative to the shoe 19, being guided by the pins 18x in the guides 16a and 17a, and as the corner 18e' approaches the shoe, the contact devices 91b, 92b, engage the contact devices 91, 92, respectively, the effect of which is to close the circuits 91', 92', and through the solenoids 85', 73" and solenoids 85, 73, start the rotation of the table 10 and shift the clutch ring 64 to change the speed of the shaft 6 to low speed, as the die 18 swings to the position to advance its end 18f relative to the shoe 19. In this latter movement of the table shown in Fig. 1b, the contact devices 97b, 98b, engage the contact devices 97, 98, to close the circuits 97', 98', the effect of which through the solenoids 85", 73', is to stop the rotation of the table and shift the clutch ring 64 to change the speed of the shaft 6 to high speed. The die side 18f then moves relative to the shoe 19, the die during this movement swinging about the axis of the pin 18x adjacent the die corner 18d'. As the die approaches the die corner 18f', the contact devices 91c, 92c, engage the contact devices 91, 92, respectively, to close the circuits 91', 92', the effect of which, through the solenoids 85', 73", is to start the rotation of the table and shift the clutch ring 64 to change the speed of the shaft 6 to low speed, as the die is moved to the Fig. 1c position to position the side 18d in relation to the shoe 19. In the rotary movement of the table 10, the contact devices 97c, 98c, engage the contact devices 97, 98, respectively, to close the circuits 97', 98', the effect of which, through the solenoids 85", 73' and solenoids 85, 73, is to stop the rotation of the table and shift the clutch ring 64 to change the speed of the shaft 6 to high speed. The die side 18d then moves relative to the shoe 19 and causes the contact device 93a to engage the contact device 93 to close the circuit 93', which in turn through solenoid 44" moves the switch device 44a' out of engagement with the contacts 44x, which de-energizes the coil of the solenoid 44, thereby releasing the shoe 19 from the formed section A, and engaging the contacts 101 to close a circuit 101'. The circuit 101' includes a time delay relay 102, the armature 102' of which engages the contacts 103, 103, to close a circuit 104, which through the solenoid 53" disengages the switch element 53a' from the contacts 53x and 53x' to de-energize the solenoids 50 and 53, whereby the clutch 48 is thrown out to stop the shaft 47 and the brake is applied, the time delay relay operating to stop the shaft 47 after the die side 18d has moved beyond the rear end of the section A. The operation of the relay 102 is controlled by a suitable dash pot 105.

It will be noted that the coils of the solenoids 85', 85", 73', 73", 44', 44", 53' and 53" are connected in a circuit separate from the circuit for the solenoids 85, 73, 44, 50 and 53 and relay 102, this separate circuit being provided by the employment of a suitable transformer, the secondary winding thereof being grounded at one side. 106 indicates an emergency stop switch for engaging the contacts 106", one thereof being connected to ground and the other being connected by a lead 107 to the circuit 104. Operation of the switch 106 will, through the solenoid 53" and solenoids 50 and 53 stop the shaft 47 and apply the brake shoes to the brake wheel thereof. Each contact device 91a, 91b, 91c, 92a, 92b, 92c, and 93a is formed with an elongated slot and secured in position by a screw extending through the slot, the slot permitting the device to be adjusted on the die to position it in position to effect engagement with its related contact device at the proper instant in the movement of the die.

Figs. 17, 18, 19, 20 and 21 illustrate certain modifications of the construction, wherein the operating means for the shoe are mounted above the table and independently thereof, and certain of the movably mounted contact devices are mounted on a driven member instead of on the die. In this arrangement, I provide a bracket or standard 108 having arm 108a which overhangs the table 10' and in which is provided guides for slidably supporting the shoe 19' to move toward and from the die 18'.

In this form of construction the die 18' and table 10' are mounted, driven and controlled similar to corresponding parts already described, the shaft which drives the pinion for the die rack being indicated at 6' and certain of the driving elements, to wit, gear 61, pinion 60 and gear 58, being shown in Fig. 18. The shoe 19' is pivotally connected to a slide 109 mounted in suitable guides 109a provided on the outer end portion of the arm 108a, and is provided with a plurality of articulatable shoe elements similarly to the shoe 19. The slide 109 is connected by a rod 41' to the piston within a cylinder 40' mounted on the bracket 108 so as to operate and support the rod 41' above the table. The cylinder 40' is operated similarly to the cylinder 40. This arrangement is advantageous as it permits of longer movement of the shoe to co-act with dies of various contours and permits the table hub to be reduced in diameter and the inner portion of the table to extend into close relation to the shaft 6' for the die operating pinion, whereby dies the length of which are relatively small may be used. 109' indicates a support mounted on the frame 2' and formed with a slot 110 to receive a bolt 111, which adjustably secures a suitable bearing 112 to the support. 113 indicates a gear in mesh with and driven by a pinion 113a and provided with the same number of teeth as are provided on the rack 20. 114 indicates a drum adapted to carry a plurality of contact device 115 (only one being shown to facilitate the illustration), which in the preferred arrangement in this form of construction operate similarly to the devices 91a, 91b, 91c, 92a, 92b, 92c, 93a, shown mounted on the die 18 in Fig. 1. The gear 113 and drum 114 are removably mounted on the bearing and detachable from each other. In the illustrated form of construction, the gear 113 is detachably secured to the inner end face of the drum and such end is provided with a hub to rotate on the bearing 112, the hub thereby rotatably supporting the gear. By making the gear 113 removable, a gear having the same number of teeth as are on the rack of any die that may be used, may be substituted. When such substitution is made and the diameter of the gear is changed, the bearing 112 is adjusted along the slot 110 so as to position the gear in meshing relation with the pinion 113a. The drum 114 is provided with a plurality of circumferential grooves whereby the contact devices may be secured in predetermined positions angularly of the drum for engagement with their respective related contact devices 116. The pinion 113a is fixed to one end of a shaft 117, the other end of the shaft having a pinion 118 in mesh with a gear 119, which may be secured to the shaft 6', for example instead of the collar 62 on shaft 6 (see Fig. 2). The pitch of the gear elements 119, 118, 113a and 113 are such as to insure one revolution of the die 18'. In this form of construction all of the contact devices shown mounted on the die 18 in Figs. 1 to 16, inclusive, are mounted on the drum 114, but it will be obvious that the contact devices mounted on the hub of the table may be mounted on the drum 114 or a separate drum. The contact devices 116 are shown as rockers having corresponding ends normally disposed in the path of movement of the devices 115 on the drum 114 and biased to normal position by suitable springs 120. The rockers 116 are insulated from each other and the shaft 121 on which they rock and connected to the circuits 91', 92', 93' (Fig. 16). The shaft 121 is mounted in a housing 122 which is adjustably mounted on a supplemental support 123 by suitable bolts, so that the contact devices 116 may be operatively related to the contact devices 115 on the drum 114 when the latter is adjusted on the support 109'.

Where the gear 113 and the drive therefor and associated parts are mounted as shown in Figs. 18 and 19, the contact devices 97 and 98 are positioned as shown in the latter view and the contact devices 97a, 97b, 97c, 98a, 98b and 98c are correspondingly positioned on the table hub 9.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a forming machine, the combination of a support, a table rotatably mounted thereon, a die of curvilinear contour movably mounted on said table and provided with a rack throughout its contour, means for securing a section of material to said die, a shoe arranged to be operatively related to the material to co-act with said die, a driven pinion engaging said rack for moving the walls of the die relative to said shoe, and means for rotating said table at predetermined positions of said die relative to said shoe.

2. In a forming machine, the combination of a support, a table rotatably mounted thereon, a die having a substantially continuous shaping wall, slidably mounted on said table, means for securing material to said die, a shoe arranged to be operatively related to the material to co-act with said die for shaping material thereon, means for rotating said table, separate means for sliding said die relative to said shoe, and means for starting and stopping the rotation of said table at predetermined positions of said die relative to said shoe.

3. In a forming machine, the combination of a support, a table rotatably mounted thereon, a die having a substantially continuous shaping wall, slidably mounted on said table, means for securing material to said die, a shoe arranged to be operatively related to the material to co-act with said die for shaping material thereon, means for rotating said table, separate means for sliding said die relative to said shoe, means for starting and stopping the rotation of said table at predetermined positions of said die relative to said shoe, and means for changing the speed of said die moving means at one of the predetermined positions of said die.

4. In a forming machine, the combination of a support, a table rotatably mounted thereon, a die having a substantially continuous shaping wall, slidably mounted on said table, means for securing material to said die, a shoe arranged to be operatively related to the material to co-act with said die for shaping material thereon, means for rotating said table, separate means for sliding said die relative to said shoe, means for starting and stopping the rotation of said table at predetermined positions of said die relative to said shoe, and means correlated with said starting and stopping means to change the speed of said die moving means.

5. In a forming machine, the combination of a support, a table rotatably mounted thereon, a die having a substantially continuous shaping wall, slidably mounted on said table, means for securing material to said die, a shoe arranged to be operatively related to the material to co-act with said die for shaping material thereon, means for sliding said die relative to said shoe independently of and relative to said table, means for maintaining said table stationary during periods in which certain portions of the die are in stock-forming relation to said shoe, means for rotating said table during periods in which other portions of the die are in stock-forming relation to said shoe, and means co-operating with said shoe for guiding said die on said table during movement of said die relative thereto.

6. In a forming machine, the combination of a support, a table rotatably mounted thereon, a die having side and end walls forming a substantially continuous shaping wall, slidably mounted on said table, means for securing material to said die, a shoe arranged to be operatively related to the material to co-act with said die to shape material thereon, means for rotating said table, means for sliding said die relative to said shoe, and means for starting and stopping the rotation of said table at predetermined positions of said die relative to said shoe to swing said die at adjoining ends of said side and end walls.

7. In a forming machine the combination of a rotatable support, a die having a substantially continuous shaping wall, movably mounted on said support, means for securing material to said die, a shoe arranged to co-act with said die to shape the material thereon, means for moving said die on said support relative to said shoe to shape the material thereon, an annular member drivingly connected to said moving means, and means for starting and stopping the rotation of said support at predetermined positions of said die relative to said shoe, said means including devices on said annular member for controlling said means in co-ordinated relation to the predetermined positions of said die.

8. In apparatus of the class described, the combination of a support, a relatively stationary shaft mounted therein, a table rotatable on said support about the axis of said shaft, a pinion on said shaft above said table, a die having substantially straight and curvilinear portions in contiguous relation forming a shaping wall, and provided with a rack in engagement with said pinion, means for securing a section of material to said die for engagement with said shaping wall, a shoe in co-active relation to said pinion, to form the material on said shaping wall, means for rotating said pinion to move said die relative to said shoe, whereby the latter forms the material on said shaping wall, means for maintaining said table stationary during periods in which the straight portions of the die are in stock-forming relation to said shoe, means for rotating said table during periods in which the curvilinear portions of the die are in stock-forming relation to the shoe, and means controlling the rotation of said table in co-ordinated relation to the movement of said straight and curvilinear die portions relative to said shoe.

9. In a forming machine, the combination of a support, a table rotatably mounted thereon, a die having substantially straight and curvilinear portions in contiguous relation forming a shaping wall, movably mounted on said table, means for securing material to said die, a relatively stationary shoe arranged to be operatively related to the material to co-act with said die to shape the material thereon, means for moving the die relative to said shoe, means for maintaining said table stationary during periods in which the straight portions of the die are in stock-forming relation to said shoe, and means for rotating said table during periods in which the curvilinear portions of the die are in stock-forming relation to the shoe.

10. In a forming machine, the combination of a support, a table rotatably mounted thereon, a die having substantially straight and curvilinear portions in contiguous relation forming a shaping wall, slidably mounted on said table, means for securing material to said die, a relatively stationary shoe arranged to be operatively related to the material to co-act with said die, means for moving the walls of the die relatively to said shoe to shape the material thereon, means for maintaining said table stationary during periods in which the straight portions of the die are in stock-forming relation to said shoe, means for rotating said table during periods in which the curvilinear portions of the die are in stock-forming relation to the shoe, and guides on said table for said die during movement of the substantially straight portions thereof relative to said shoe.

11. In a forming machine, the combination of a support, a table rotatably mounted thereon, a die having a substantially continuous shaping wall, movably mounted on said table, means for securing material to said die, a relatively stationary shoe arranged to be operatively related to the material to co-act with said die, mechanisms for moving said die throughout its cycle of movement and for rotating said table, and electrical means for controlling said mechanisms to move said die relative to and independently of said table and shoe and to start and stop the rotation of said table during movement of said die and intermediate its cycle of movement.

12. In a forming machine, the combination of a support, a table rotatably mounted thereon, a die having a substantially continuous shaping wall, slidably mounted on said table, means for securing material to said die, a shoe arranged to be operatively related to the material to co-act with said die, for shaping material thereon, means for sliding said die on said table relative to said shoe, means for maintaining said table stationary during periods in which certain portions of the die are in stock-forming relation to said shoe, means for rotating said table during periods in which other portions of the die are in stock-forming relation to the shoe, and mechanism, including devices at predetermined positions of said die relative to said shoe, for controlling said die sliding means and said table rotating means.

13. A forming machine as claimed in claim 12 wherein certain of said devices are mounted on said die.

14. In a forming machine, the combination of a support, a die having a substantially continuous contour movably mounted on said support and provided on its outer side with a shaping wall having straight and curvilinear portions in contiguous relation and on its inner side with a rack, means for securing a section of material to said die, a shoe arranged to be operatively related to the material to co-act with said shaping wall, a pinion engaging said rack opposite said shoe for moving the die shaping wall relative to said shoe, means for driving said pinion, and means co-ordinated with the straight and curvilinear portions of said die for operating said driving means at different speeds.

15. In a forming machine, the combination of a support, a table rotatably mounted thereon, a die having substantially straight and curvilinear shaping walls in contiguous relation, slidably mounted on said table, means for securing material to said die, a shoe arranged to be operatively related to the material to co-act with said shaping walls to shape the material thereon, mechanism for sliding said die relative to said shoe, and said table, means for maintaining said table stationary during periods in which the straight portions of the die are in stock-forming relation to said shoe, and means for rotating said table during periods in which the curvilinear portions of the die are in stock-forming relation to the shoe and simultaneously reducing the speed of said die sliding mechanism.

16. In a forming machine, the combination of a support, a table rotatably mounted thereon, a die having substantially straight and curvilinear shaping walls in contiguous relation, slidably mounted on said table, guide means on said table for said die, means for securing one end of a section of material to said die in operative relation to one of said shaping walls, a shoe arranged to engage the material and co-act with said shaping walls to shape the material thereon, means for sliding said die at one speed to advance each said straight shaping wall relative to said shoe and at a different speed to advance each said curvilinear shaping wall relative to said shoe, means for maintaining said table stationary during periods in which said straight shaping walls are in stock-forming relation to said shoe, and means for rotating said table during periods in which said curvilinear shaping walls are in stock-forming relation to said shoe, whereby said die is swung into position to permit the succeeding straight portion thereof to be moved relative to said shoe.

17. In a forming machine, the combination of a support, a table rotatably mounted thereon, a die slidably mounted on said table and provided on its outer side with substantially straight and curvilinear shaping walls in contiguous relation and on its inner side with a rack, means for securing a section of material to said die, a shoe arranged to be operatively related to the material to co-act with said shaping walls, a pinion engaging said rack opposite said shoe for moving the die shaping walls relative to said shoe, means for maintaining said table stationary during periods in which the straight portions of the die are in stock-forming relation to said shoe, means for rotating said table during periods in which the curvilinear portions of the die are in stock-forming relation to said shoe, and means on said table for guiding said die in substantially rectilinear directions during movement of its straight portions relative to said shoe.

18. In apparatus of the class described, the combination of a support, a table rotatably mounted thereon, a substantially continuous die spaced portions of which are curvilinear, slidably mounted on said table, co-operatively related elements engaging the opposite walls of said die, one of said elements consisting of a shoe and the other element having driving engagement with said die, means for supplying a section of material between said shoe and die, means for rotating the last mentioned element to slide said die relative to said shoe, means for rotating said table during periods in which the curvilinear portions of the die are in stock-forming relation to said shoe, and means for maintaining said table stationary during perods in which other portions of the die are in stock-forming relation to the shoe.

19. In a forming machine, the combination of a support, a die having substantially straight and curvilinear portions in contiguous relation forming a shaping wall, movably mounted on said support, means for securing material to said die, a shoe arranged to be operatively related to the material to co-act with said die, means for moving the walls of the die relative to said shoe to form the material thereon, means for swinging said die about imaginary axes substantially co-incident to the respective centers of certain of the curvilinear portions during engagement of said shoe with such portions, and means for starting and stopping said swinging means to effect the aforesaid swinging movements.

20. In a forming machine, the combination of a support, a die having substantially straight and curvilinear portions in contiguous relation forming a shaping wall, movably mounted on said support, means for securing material to said die, a shoe arranged to be operatively related to the material to co-act with said die, mechanism for moving the walls of the die relative to said shoe to form the material thereon, said mechanism including means for changing the speed thereof, and separate means for swinging said die about imaginary axes substantially co-incident to the respective centers of certain of the curvilinear portions during engagement of said shoe therewith.

21. In a forming machine, the combination of a support, a table rotatably mounted thereon, a die having a substantially continuous shaping wall, slidably mounted on said table, a rack on said die substantially co-extensive with said shaping wall, means for securing material to said die, a relatively stationary shoe arranged to be operatively related to the material to co-act with said wall to shape the material thereon, mechanism including a pinion engaging said rack for moving the die relative to said table and the shaping wall thereof relative to said shoe, mechanism arranged to rotate said table, and means for connecting the last mentioned mechanism to said table for rotating the latter while a predetermined portion of said die shaping wall is moving relative to said shoe.

22. In a forming machine, the combination of a support, a die having a substantially continuous shaping wall comprising straight and curvilinear portions in contiguous relation, slidably mounted on said support, means for securing one end of a section of material to said die in operative relation to one of said shaping wall portions, a shoe arranged to engage the material and co-act with said shaping wall for shaping the material thereon, means for sliding said die relative to said support to advance said shaping wall and material relative to said shoe throughout the length of the section of material, means separate from said sliding means for swinging said die from one position to another position during movement of each curvilinear portion of said shaping wall relative to said shoe, and means controlled by the position of said shaping wall for starting and stopping said swinging means.

23. In a forming machine, the combination of a support, a die comprising inner and outer walls having substantially straight and curvilinear portions in contiguous relation, said outer wall forming a shaping surface, slidably mounted on said support, means for securing material to said die, a shoe arranged to be operatively related to the material to co-act with said shaping surface to shape material thereon, driven means in opposed relation to said shoe and bearing on said inner wall for sliding the die on said support to move said portions relative to said shoe to form the material on said shaping surface, the arrangement being such that the shoe serves to maintain said inner wall in engagement with said driven means, and separate means for swinging said die about the axes of certain of said curvilinear portions during the engagement of such portions with said shoe and said sliding means.

HOWARD I. MORRIS.